(12) United States Patent
Hung et al.

(10) Patent No.: US 8,577,393 B2
(45) Date of Patent: *Nov. 5, 2013

(54) SYSTEM AND METHOD FOR PROVIDING TIME ZONE AS INSTANT MESSAGING PRESENCE

(71) Applicant: Research In Motion Limited, Waterloo (CA)

(72) Inventors: Michael Hin Kai Hung, Toronto (CA); Tabarak Khan, HoffMan Estates, IL (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,118

(22) Filed: Oct. 8, 2012

(65) Prior Publication Data

US 2013/0036184 A1 Feb. 7, 2013

Related U.S. Application Data

(63) Continuation of application No. 12/713,923, filed on Feb. 26, 2010, now Pat. No. 8,301,169.

(60) Provisional application No. 61/249,444, filed on Oct. 7, 2009.

(51) Int. Cl.
*H04L 1/00* (2006.01)

(52) U.S. Cl.
USPC ..................................... 455/456.3

(58) Field of Classification Search
USPC ......... 455/456.3, 456.1, 404.2, 466, 518, 519
See application file for complete search history.

(56) References Cited

U.S. PATENT DOCUMENTS

| 7,302,270 | B1 | 11/2007 | Day |
| 2005/0114768 | A1 | 5/2005 | Atkin et al. |
| 2007/0088818 | A1 | 4/2007 | Roberts et al. |

(Continued)

FOREIGN PATENT DOCUMENTS

| CN | 101331493 A | 12/2008 |
| EP | 1209929 | 5/2002 |

(Continued)

OTHER PUBLICATIONS

New in Labs; Sender Time Zone; The Official Gmail Blog; http://gmailblog.blogspot.com/2009/04/new-in-labs-sender-time-zone.html; Posted by Brodziak, Marcin; Apr. 8, 2009; Accessed at least as early as Oct. 20, 2009.

(Continued)

*Primary Examiner* — Melody Mehrpour
(74) *Attorney, Agent, or Firm* — Novak Druce Connolly Bove + Quigg LLP

(57) ABSTRACT

A system and method are provided to obtain and use time zone information as presence in instant messaging. The time zone information is obtained by a user's mobile device and is sent to other mobile devices corresponding to the user's contacts. The time zone information of a contact may be displayed on the user's IM application, including the contact list and instant messaging conversation window. The location of the mobile device may also be provided. The user uses the time zone and location information to discern the status of a contact. Rule-based decisions that rely on the time zone information are also used to affect the operation of the instant messaging application.

27 Claims, 24 Drawing Sheets

(56) References Cited

U.S. PATENT DOCUMENTS

| | | | |
|---|---|---|---|
| 2007/0088839 A1 | 4/2007 | Yoakum | |
| 2007/0160024 A1 | 7/2007 | Jung et al. | |
| 2008/0009293 A1* | 1/2008 | Bennett et al. | 455/445 |
| 2008/0153474 A1 | 6/2008 | Scott | |
| 2009/0124271 A1* | 5/2009 | Roundtree et al. | 455/466 |
| 2010/0145835 A1* | 6/2010 | Davis et al. | 705/30 |
| 2010/0261486 A1* | 10/2010 | Sheha et al. | 455/457 |
| 2010/0279710 A1* | 11/2010 | Dicke et al. | 455/456.3 |

FOREIGN PATENT DOCUMENTS

| | | |
|---|---|---|
| EP | 1594296 | 11/2005 |
| EP | 1936552 | 6/2008 |
| EP | 2068534 | 6/2009 |
| JP | 2008042626 | 2/2008 |
| WO | 0235869 | 5/2002 |
| WO | 2007068668 A2 | 6/2007 |
| WO | 2007134623 | 11/2007 |

OTHER PUBLICATIONS

Extended European Search report mailed May 28, 2010, in corresponding European patent application No. EP10154835.

A plugin Idea for Gaim; Buddy's Time Zone; http://www.actsofvolition.com/archive/2004/december/apluginideafor; Posted by Garrity, Steven in Open Source Software, Usability & Design; Accessed at least as early as Oct. 20, 2009.

Tang, John and Begole, James (Sun labs); ACM Queue—"beyond Instant Messaging", Jan. 28, 2004; http://queue.acm.org/detail.cfm?id=966718, Accessed at least as early as Oct. 20, 2009.

Silverorange Features List; htpp://www.silverorange.com/a/intranet/features/; Accessed at least as early as Oct. 20, 2009.

3 GPP TS 22.042, V8.0.; http://www.quintillion.com.jp/3GPP/Specs/22042-800.pdf; Accessed at least as early as Oct. 7, 2009.

English abstract for CN101331493; published on Dec. 24, 2008 and retrieved on Apr. 22, 2013.

The First Office Action mailed Mar. 1, 2013, in corresponding Chinese patent application No. 201010512775.9.

Ranganathan, Anand et al.; Context-Aware Communication; IEEE Computer Society; Apr. 2003; pp. 90 to 92; http://choices.cs.uiuc.edu/~ranganat/Pubs/IEEEComputer.pdf.

Office Action mailed Jul. 9, 2013, in corresponding Canadian patent application No. 2,716,816.

* cited by examiner

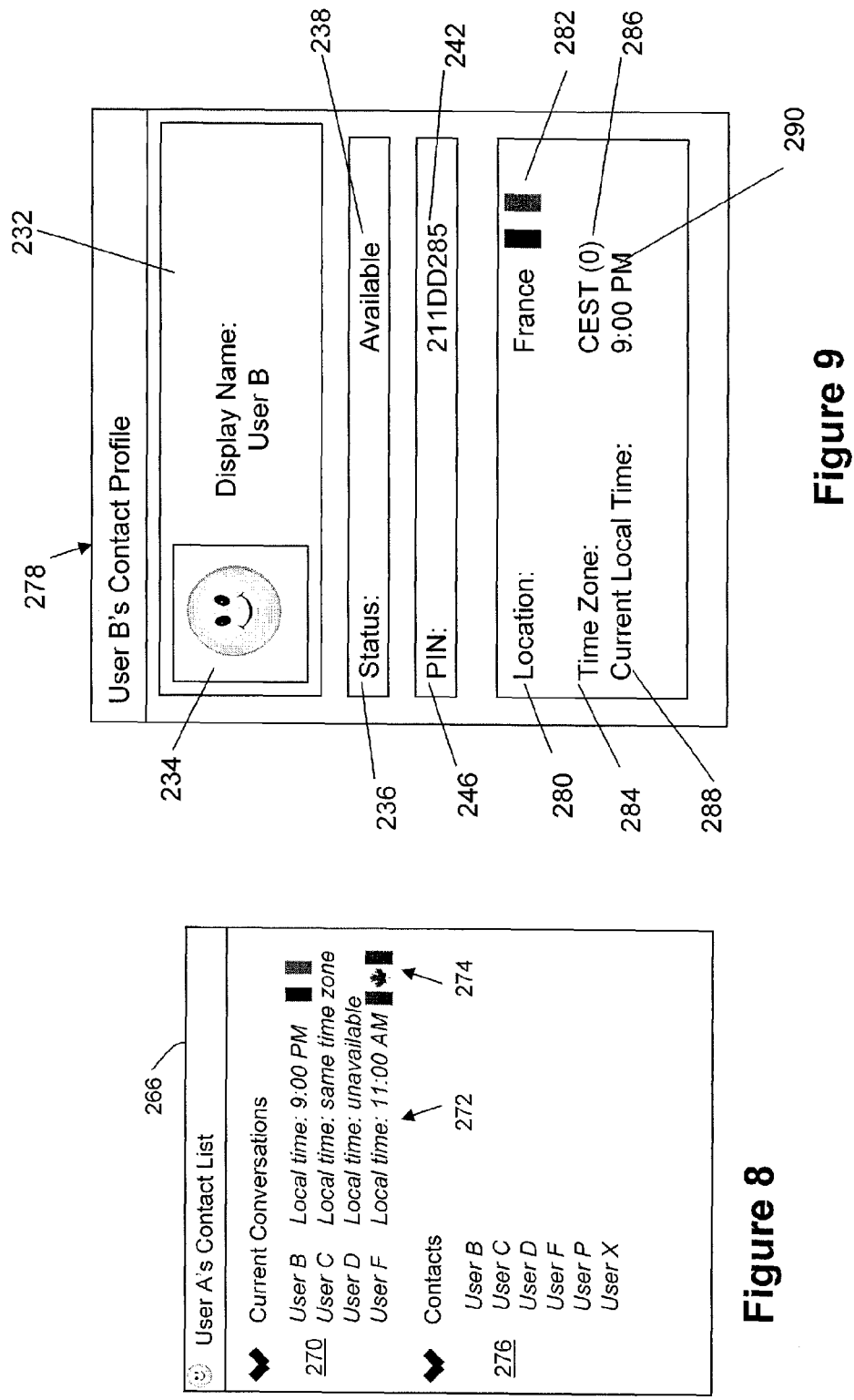

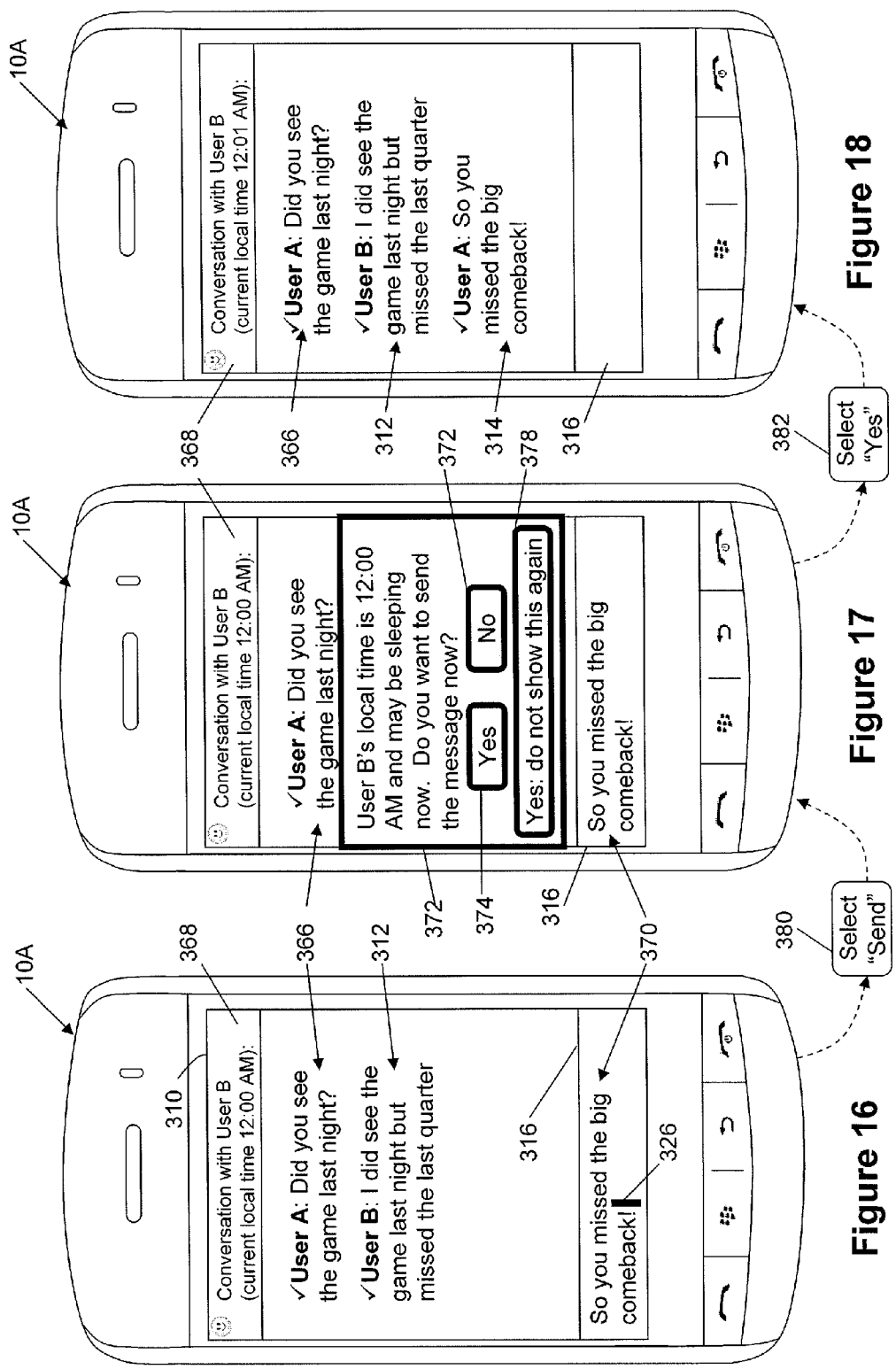

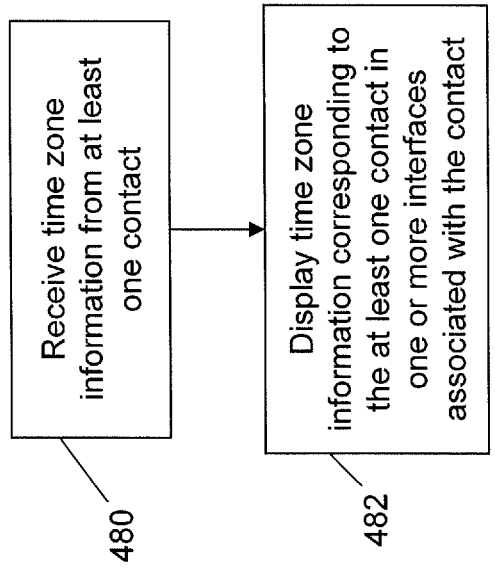

Figure 31

480 — Receive time zone information from at least one contact

482 — Display time zone information corresponding to the at least one contact in one or more interfaces associated with the contact

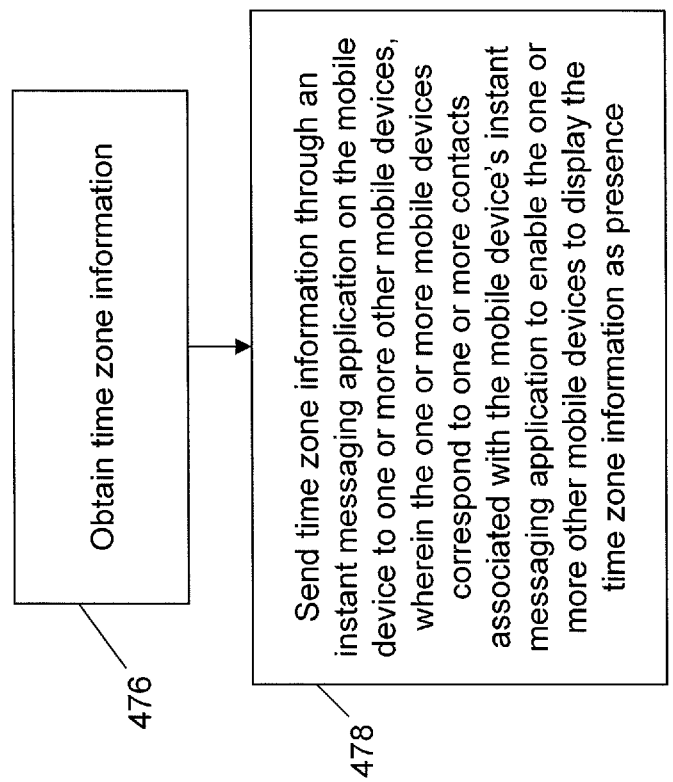

Figure 30

476 — Obtain time zone information

478 — Send time zone information through an instant messaging application on the mobile device to one or more other mobile devices, wherein the one or more other mobile devices correspond to one or more contacts associated with the mobile device's instant messaging application to enable the one or more other mobile devices to display the time zone information as presence

SYSTEM AND METHOD FOR PROVIDING TIME ZONE AS INSTANT MESSAGING PRESENCE

CROSS-REFERENCE TO RELATED APPLICATIONS

This application is a continuation of U.S. patent application Ser. No. 12/713,923 filed on Feb. 26, 2010 which claims priority from U.S. Provisional Application No. 61/249,444 filed on Oct. 7, 2009, both incorporated herein by reference.

TECHNICAL FIELD

The following relates to systems and methods for providing time zone information as instant messaging presence.

BACKGROUND

Instant messaging has become a popular way of electronically communicating in a conversational style, in particular using a mobile or handheld device. Whether instant messaging on a desktop computer or a mobile device, profiles or presence information are often used to allow a user to view the current status of other contacts, as well as allow other contacts to view the current status of the user. For example, the presence information may show a contact is busy or available.

When instant messaging with contacts or "buddies", a user and a contact may be in different situations. For example, if the user is aware that a contact is busy, then the user may decide not to send a message to the contact. However, displaying whether a contact is busy or available may not provide the user with sufficient presence information to discern the situation of the contact.

BRIEF DESCRIPTION OF THE DRAWINGS

Embodiments will now be described by way of example only with reference to the appended drawings wherein:

FIG. 8 is an example screen shot of an instant messaging contact list as seen by User A and showing the time zone information as presence for the contacts.

FIG. 9 is an example screen shot of User B's contact profile as seen by User A.

FIGS. 16, 17 and 18 are pictorial diagrams of a mobile device displaying an instant messaging conversation between User A and User B, and showing a prompt that confirms whether a new message from User A should be sent to User B, based on User B's local time.

FIG. 30 is a flow chart illustrating example computer executable instructions for providing time zone information as instant messaging presence.

FIG. 31 is a flow chart illustrating example computer executable instructions for displaying time zone information for at least one contact listed in an instant messaging application.

DETAILED DESCRIPTION OF THE DRAWINGS

In instant messaging (IM) applications the presence of a user, or a user's contact, or both may change depending on various circumstances. A user and a contact may be in different circumstances, and thus, it is desirable to convey such circumstances. It has been realized that when a user and a contact are in different time zones, the difference in time zones may affect whether instant messages are sent, as well as affect the expectation as to when a sent instant message is read by the contact.

In the following, a method and system are provided to identify the local time zone of a mobile device, and allow a user to share the time zone information with contacts through an instant messaging application. Similarly, the user would be able to view the local time zone information of the instant messaging contacts. The time zone information can be exchanged between instant messaging users through the instant messaging application's presence data. It will be appreciated that although the following examples are provided in the context of instant messaging, the principles discussed herein are equally applicable to other conversational-type message exchange services, e.g. SMS, MMS, etc.

The following examples include communications between mobile or handheld devices, which will be commonly referred to as mobile devices hereinafter and referred to by numeral 10.

The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a two-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 1.

Figure 1:
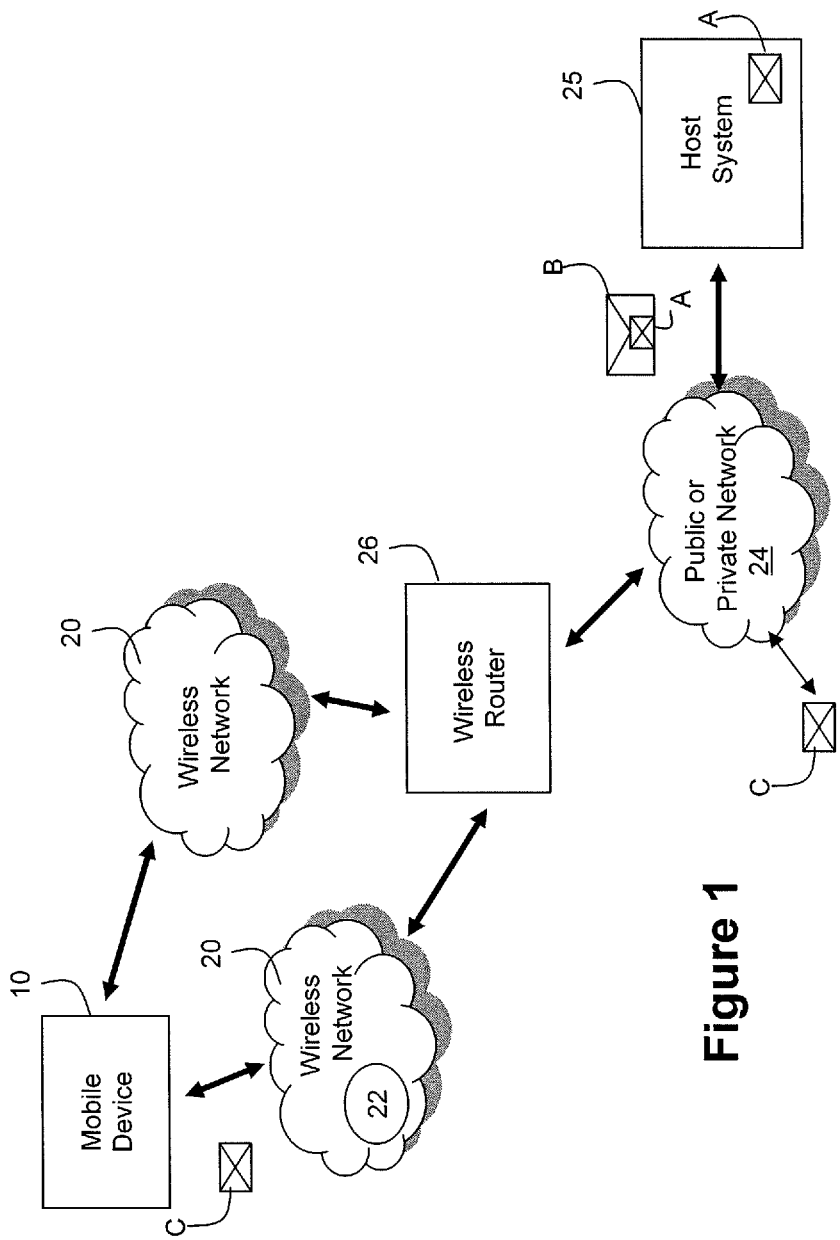
FIG. 1 is a schematic diagram illustrating a system in which data items are pushed from a host system to a mobile device.

FIG. 1 is an example system diagram showing the redirection of user data items (such as message A or C) from a corporate enterprise computer system (host system) 25 to the user's mobile device 10 via a wireless router 26. The wireless router 26 provides the wireless connectivity functionality as it acts to both abstract most of the wireless network's 20 complexities, and it also implements features necessary to support pushing data to the mobile device 10. Although not shown, a plurality of mobile devices may access data from the host system 25. In this example, message A in FIG. 1 represents an internal message sent from, e.g. a desktop computer (not shown) within the host system 25, to any number of server computers in the corporate network (e.g. LAN), which may, in general, include a database server, a calendar server, an E-mail server or a voice-mail server.

Message C in FIG. 1 represents an external message from a sender that is not directly connected to the host system 25, such as the user's mobile device 10, some other user's mobile device (not shown), or any user connected to the public or private network 24 (e.g. the Internet). Message C could be e-mail, voice-mail, calendar information, database updates, web-page updates or could even represent a command message from the user's mobile device 10 to the host system 25. The host system 25 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 10 may be adapted for communication within wireless network 20 via wireless links, as required by each wireless network 20 being used. As an illustrative example of the operation for a wireless router 26 shown in FIG. 1, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a corporate enterprise network environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 2) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations.

Figure 2:
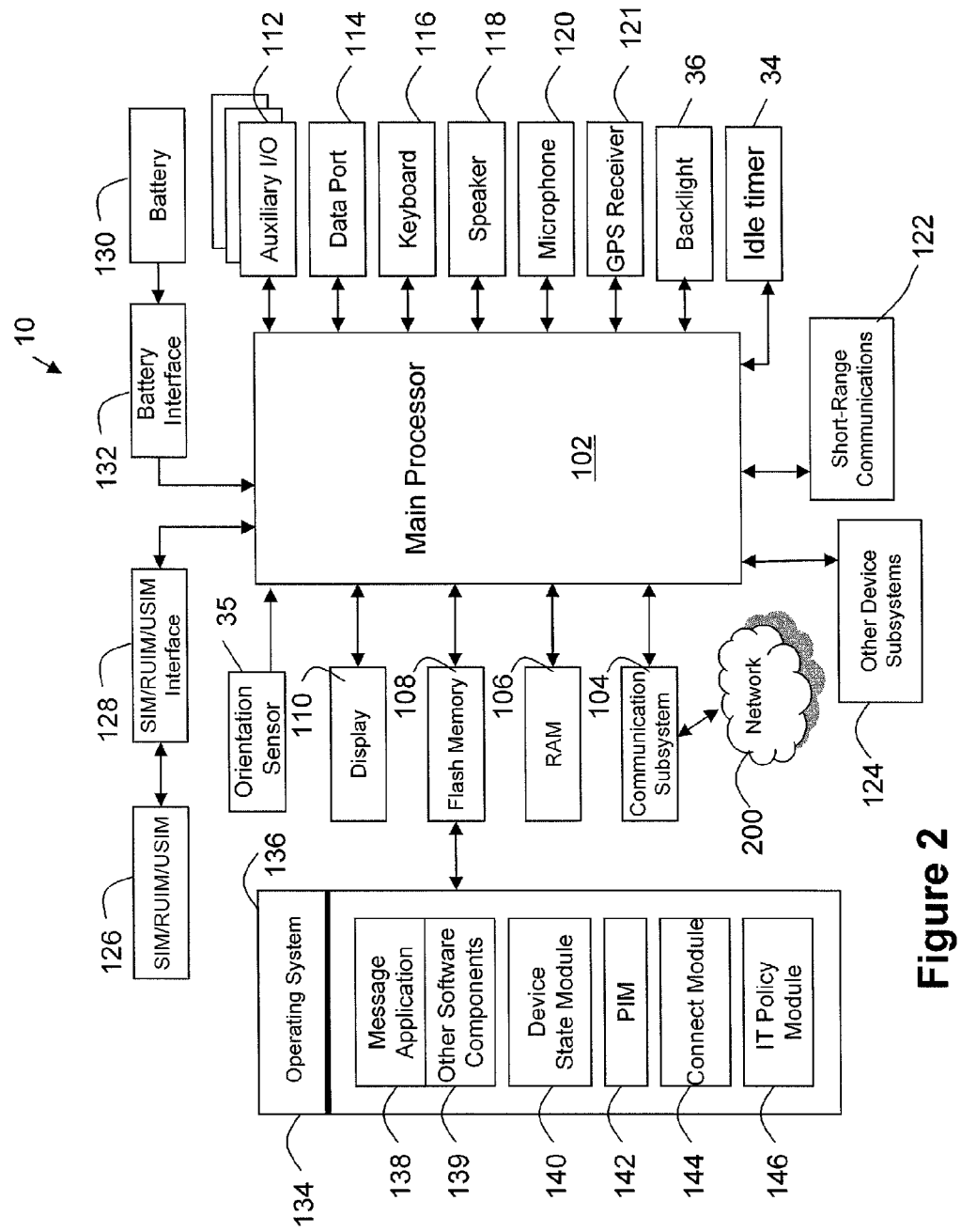
FIG. 2 is a block diagram of an example embodiment of a mobile device.
Figure 3:
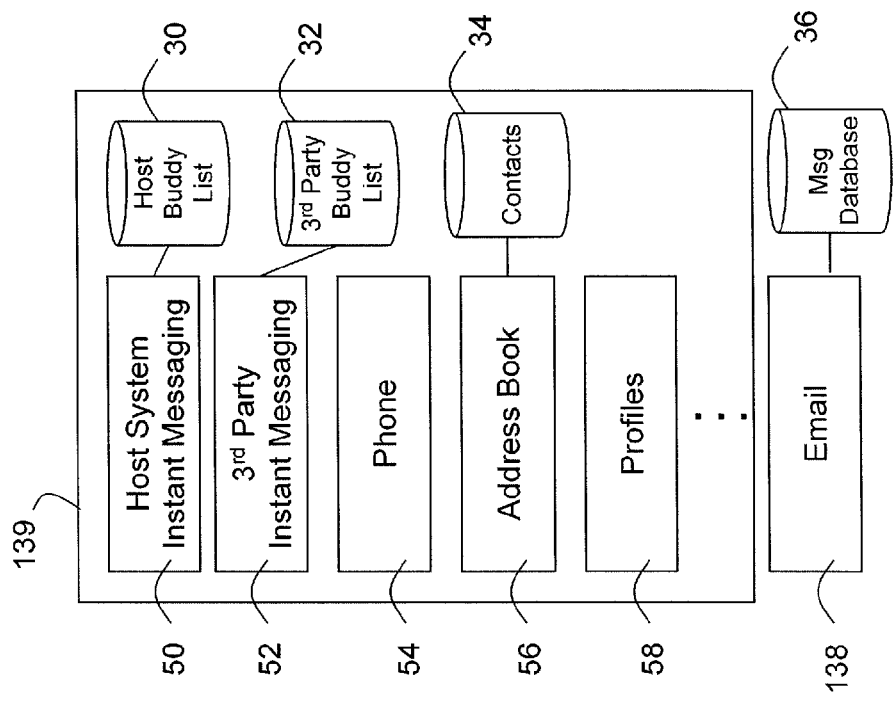
FIG. 3 is a block diagram illustrating example ones of the other software applications and components shown in FIG. 2.

An example configuration for the mobile device 10 is illustrated in FIGS. 2-3. Referring first to FIG. 2, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail, text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

The main processor 102 can also control a backlight 36 for conserving battery life when the mobile device 10 is locked or otherwise not in use (e.g. in a holster). The backlight 36 can be used to illuminate the display 110 when the mobile device 10 is being used. The backlight 36 can be associated with an idle timer 34 such that an idle time can be tracked and if it reaches or exceeds a certain predetermined threshold (or user definable threshold), the backlight 36 is turned off. As will be explained below, the idle timer 34 can also be used to provide a current idle time to the main processor 102 for other uses such as to determine inactivity of the user. The main processor 102 may also utilize data provided by an orientation sensor 35. The orientation sensor 35 may comprise an inclinometer or other sensor capable of determining the orientation of the mobile device 10 with respect to a datum.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 3 shows an example of the other software applications and components 139 that may be stored on and used with the mobile device 10. Only examples are shown in FIG. 3 and such examples are not to be considered exhaustive. In this example, a host instant message application 50, $3^{rd}$ party instant messaging application 52, phone application 54, address book 56 and a profiles application 58 are shown to illustrate the various features that may be provided by the mobile device 10. Also shown in FIG. 3 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

The host system instant messaging application 50 is an instant messaging service that is hosted and provided by the host system 25 in this example, e.g. using a messaging server at the wireless router 26 as exemplified in FIG. 4 and discussed below. The host system instant messaging application 50 includes or otherwise has access to a host buddy list 30 for storing contact information for buddies also using the host system instant messaging application 50. The $3^{rd}$ part instant messaging application 52 includes or otherwise has access to a $3^{rd}$ party buddy list 32 for storing contact information for buddies also using the $3^{rd}$ party instant messaging application 52. It will be appreciated that any number of host system or $3^{rd}$ party instant messaging services can be installed and run on the mobile device 10 and thus the two shown in FIG. 3 are for illustrative purposes only. Also, it will be appreciated that in other embodiments, only a single instant messaging service may be supported or a unified instant messaging service that combines contact or buddy lists for multiple instant messaging services and utilizes a common user interface (not shown).

Figure 4:
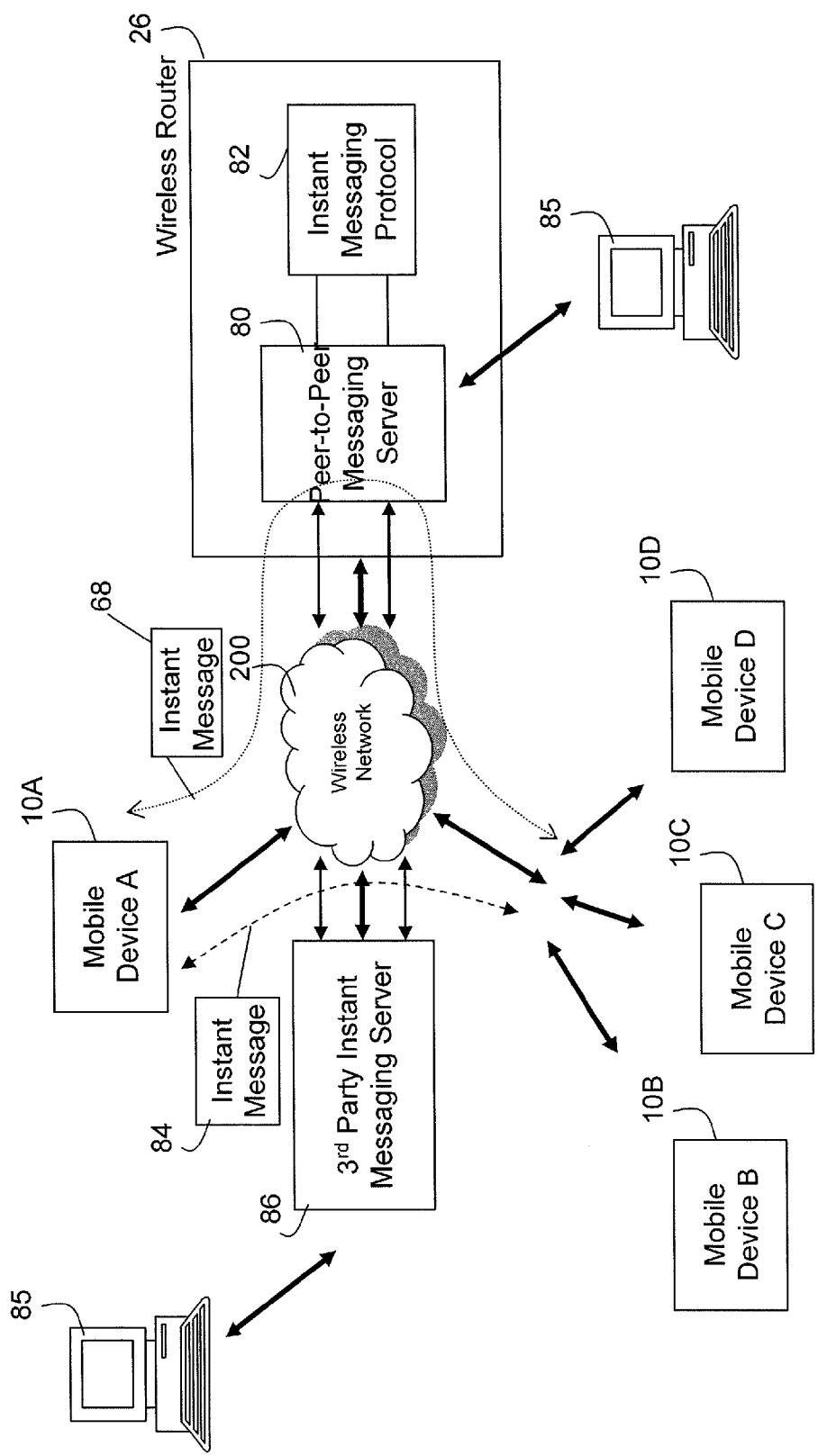
FIG. 4 is a system diagram showing one configuration for instant messaging on multiple platforms.

FIG. 4 illustrates a configuration suitable for a user of mobile device A, hereafter referred to as mobile device 10A, to conduct instant messaging with buddies included in their IM buddy lists 30, 32. It can be seen in FIG. 4 that the two examples of instant messaging systems from FIG. 3 are shown. The host system IM service is shown that utilizes the wireless router 26 and a 3rd party instant messaging service is also shown that utilizes a 3rd party instant messaging server 86 accessed by mobile device 10A through the network 20. The host system IM service can be implemented in any suitable manner but for the sake of illustration, the following describes the host system IM service as being a personal identification number (PIN)-based messaging system. As can be seen, the 3rd party instant messaging server 86 may also communicate with users of a desktop 85 thus facilitating instant messaging between users of a desktop 85 and between a mobile device user 10 and a user on desktop 85. Similarly, the PIN-based messaging system may also facilitate communications with desktop users 85.

In the embodiment illustrated in FIG. 4, the PIN-based messaging system is implemented using a server-based communication infrastructure, such as one that provides email, SMS, voice, Internet and other communications. Particularly suitable for hosting a peer-to-peer messaging server 80, is the wireless router 26 used in systems such as those shown in FIG. 1. In FIG. 4, the wireless router 26 facilitates communications such as instant messaging between mobile device 10A and mobile devices for User B, User C and User D, denoted by 10B, 10C and 10D respectively. It will be appreciated that the number of users participating in the example shown in FIG. 4 is for illustrative purposes only. Instant messaging is provided by the instant messaging applications 50, 52 stored on each mobile device 10A-10D which can be initiated, for example, by highlighting and selecting a corresponding instant messaging icon from a display for the mobile device 10. In the host system IM service, the wireless router 26 routes messages between the mobile devices 10A-10D according to a PIN-to-PIN protocol 82.

A PIN-to-PIN based instant message is generally denoted by numeral 68 in FIG. 4 and may differ in structure from a 3$^{rd}$ party based instant message 84. In a PIN-based messaging protocol 82, each message 68 has associated therewith a PIN corresponding to the mobile device 10 which has sent the message 68 (source) and includes a destination PIN identifying the intended recipient (destination). Although not shown in FIG. 4, each message 68 generally comprises a body, which contains the content for the message 68 (e.g. text), and a header, which contains various fields used for transmitting and processing each message 68. In this example, the header includes a message type field to specify the type of transmission (e.g. PIN, SMS etc.), a source field to specify the device address for the sender, a destination field to specify the device address for the intended recipient, a conversation ID field to identify which conversation thread the message 68 corresponds to (e.g. such that each message 68 is identified by the conversation in which it was sent), and a timestamp field to indicate the time (and if desired, the date) at which the message 68 was sent by the designated sender.

Although not shown in FIG. 4, one or more tags can also be used to indicate to the host system IM application 50, upon receipt of a message 68, that the message 68 has certain attributes such as a subject that is to be displayed, whether additional information is being transported (i.e. data or information in addition to the message content), or whether the message 68 is being used for some other purpose such as provisioning, synchronization, etc. In general, in a PIN based messaging protocol 82, the sender of the message 68 knows the PIN of the intended recipient. This is preferably established when the two devices request to add each other to their respective contact or buddy lists. At the time of requesting new contacts, in traditional PIN-to-PIN protocols 82, the two respective PIN numbers may be exchanged via request e-mails which are configured to be intercepted by the respective host system instant messaging applications 50 so as to not appear in the message list or "inbox" of the user.

It can be seen in the example shown in FIG. 4 that mobile device 10A can communicate directly with any of the mobile devices 10B-10D through the peer-to-peer messaging server 80 as indicated by the short-dashed line. Instant messaging can also be accomplished through the 3rd party IM server 86 by sending 3rd party based instant messages 84 over the wireless network 20 as indicated by the long-dashed line.

When conducting a PIN-to-PIN instant messaging session according to the embodiment shown in FIG. 4, the mobile devices 10A-10D can communicate directly with the wireless router 26 in a client based exchange where, similar to other peer-to-peer programs, an intermediate server is not required. A message 68 sent by one mobile device 10 is received by the wireless router 26, which obtains the PIN number for the intended recipient from information associated with the message (e.g. a data log) or from the message itself. Upon obtaining the recipient's PIN according to the PIN-to-PIN protocol 82, the wireless router 26 then routes the message 68 to the recipient associated with the mobile device 10 having such PIN. The wireless router 26 typically also provides a delivery confirmation to the original sender, which may or may not be displayed to the user. The destination device can also provide such delivery information. The wireless router 26 should be capable of routing messages 68 reliably and hold onto the messages 68 until they are successfully delivered. Alternatively, if delivery cannot be made after a certain timeout period, the wireless router 26 may provide a response indicating a failed delivery. The wireless router 26 may choose to expire a message 68 if a certain waiting period lapses.

It will also be appreciated that, as noted above, instant messaging can be implemented using any other suitable protocol such as SMS. In SMS, a message is transmitted to an SMS center (SMSC) within a carrier's infrastructure, and then delivered to the mobile phone number of the destination device. The SMSC would also be configured to hold onto messages and deliver then once the destination device is within coverage.

When conducting an instant messaging session using a 3rd party IM application, access to the 3rd party IM server 86 is first established and instant messages 84 exchanged over the wireless network 20 according to the appropriate protocol used by the 3rd party. It will be appreciated that the principles discussed below are equally applicable to both PIN-to-PIN messaging and other Internet service-based instant messaging systems hosted by such 3rd parties.

Figure 5:
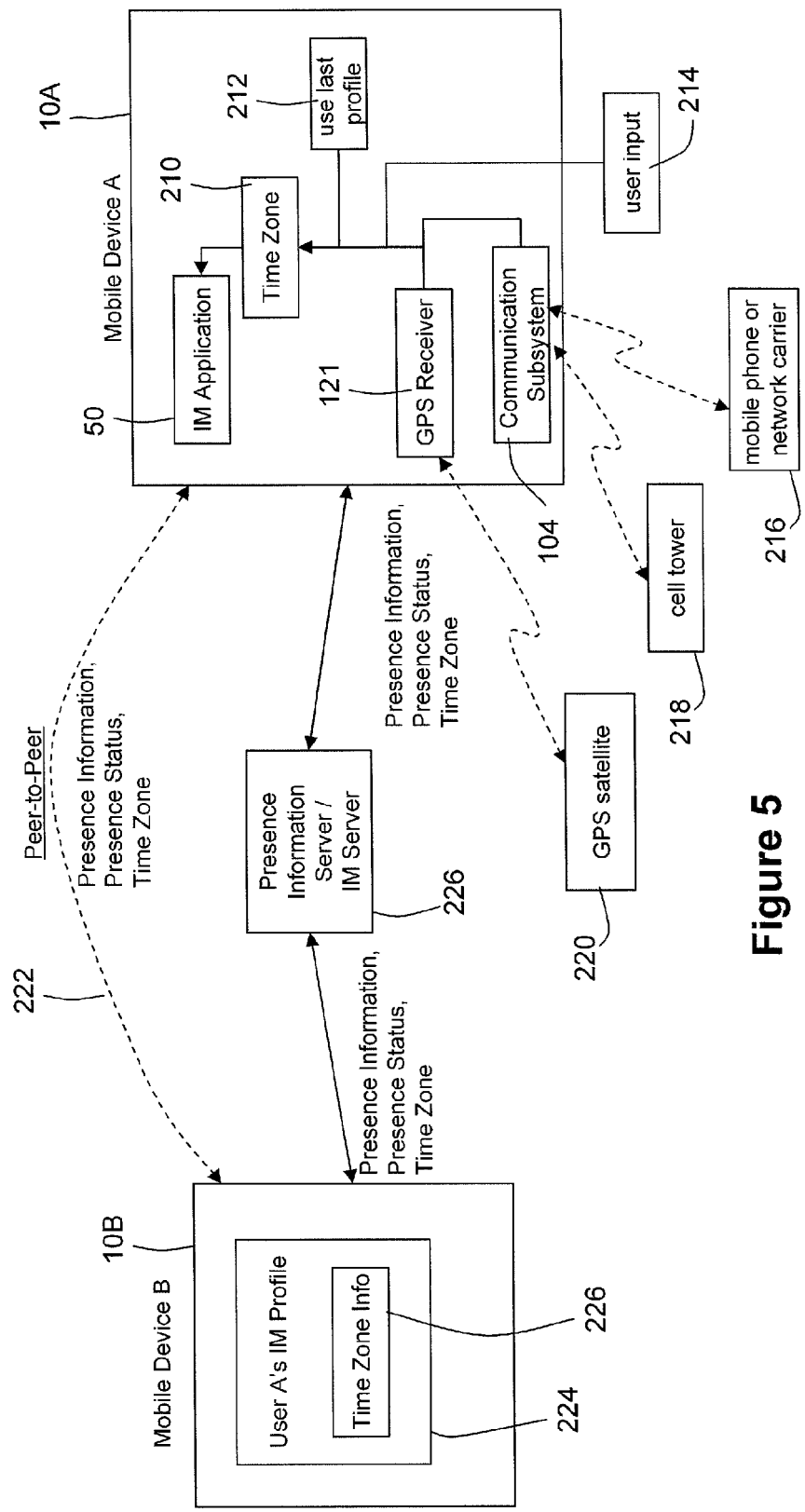
FIG. 5 is a system diagram showing one configuration for retrieving and sharing time zone information through instant messaging.

Turning now to FIG. 5, an embodiment of a system configured for obtaining and sharing time zone information between mobile device 10A and mobile device 10B is shown. A mobile device 10, for example mobile device 10A, is able to retrieve time zone information from various sources. In one embodiment a time zone application 210, either separate from or part of the IM application 50, retrieves time zone information through the communication subsystem 104. For example, as mobile device 10A moves from one location to another, a cellular carrier or network carrier 216 tracks the location of mobile device 10A and accordingly transmits the local time, as well as time zone information, to mobile device 10A. The carrier 216 may provide the time zone information in one of the frames that the carrier 216 broadcasts, which, in some cases, is similar to providing network time. Thus, the carrier 216 determines and transmits the time zone information to mobile device 10A through the communication subsystem 104. The time zone information may also be determined by the location of mobile device 10A relative to various cell towers 218. In other words, the communication subsystem 104 is aware of the location of one or more of the cell towers 218 with which it is communicating and, thus, based on the location of the cell towers 218, the location and time zone information of mobile device 10A is determined. It can be appreciated that the time zone information may be sent to a mobile device 10 in response to any one of the following events: 1) upon registering on the network; 2) when the mobile device 10 geographically relocates to a different local time zone; 3) when the network changes its local time zone, e.g. between summer and winter time; 4) when the network changes its identity; and 5) at any time during a signalling connection with mobile station.

The time zone information may also be determined using the GPS receiver 121, which is in communication with one or more GPS satellites 220. For example, the location of mobile phone 10A may be determined through the GPS receiver 121, thereby allowing the time zone information to be also determined.

The time zone information may also be determined through user input 214. The user may directly input or select the time zone for which the user wishes to display. Alternatively, the user may input or select a location (e.g. city) from which the time zone can be determined.

It can thus be seen that there are a number of ways in which the time zone module 210 can obtain the time zone information, and that any other systems and methods for obtaining time zone information are applicable to the principles described herein.

The IM application 50 on mobile device 10A may share the time zone information, or both the time zone and location information, with one or more mobile devices, for example mobile device 10B. In one embodiment, the time zone information is shared in the same way that presence information is shared. As discussed above, mobile device 10A and mobile device 10B may be in direct communication with one another through peer-to-peer communication 222, using the PIN-to-PIN protocol 82. Thus, the presence information, including the time zone information or time zone and location information, may be sent between the mobile devices 10A and 10B through the peer-to-peer communication 222.

The presence information may also be transferred through a presence information server or IM server 86. The IM server 86 may collect the presence information from a number of mobile devices 10 and broadcast the presence information to a number of other mobile devices 10. For example, if the user of mobile device 10A, hereinafter referred to as User A, is a contact on mobile device 10B, then the IM server 86 will broadcast the presence information of User A to mobile device 10B. The IM server 86 may collect the presence information by polling the mobile devices 10, or the mobile devices 10 may push the presence information, or both.

As will be discussed in further detail below, the time zone information or time zone and location information may be transmitted between mobile devices through other methods, in addition to presence information. For example, the time zone information may be sent as an instant message 84, 68, or may be sent in the header of an instant message 84, 68.

Continuing with FIG. 5, once the time zone information, or time zone and location information, of mobile device 10A is received by mobile device 10B, then the information is associated with User A and is updated on User A's instant messaging profile 224 on mobile device 10B. In particular, the time zone information becomes part of User A's time zone information 226.

Turning to FIG. 30, example computer executable instructions are provided for providing time zone information as instant messaging presence. At block 476, the mobile device 10 obtains time zone information. As discussed above, the time zone information can be obtained using several different approaches (e.g. GPS, manual input, cell towers, etc.). At block 478, the mobile device 10 sends time zone information through an instant messaging application 50 on the mobile device 10 to one or more other mobile devices 10. The other mobile devices 10 correspond to one or more contacts associated with the mobile device's instant messaging application 50 to enable the other mobile devices 10 to display the time zone information as presence.

In FIG. 31, example computer executable instructions are provided for displaying time zone information as instant messaging presence. At block 480, a mobile device 10 receives time zone information from at least one contact. The mobile device 10 then displays the time zone information corresponding to the at least one contact in one or more interfaces associated with the contact (block 482). Examples of such interfaces will be discussed further below.

Figure 22:
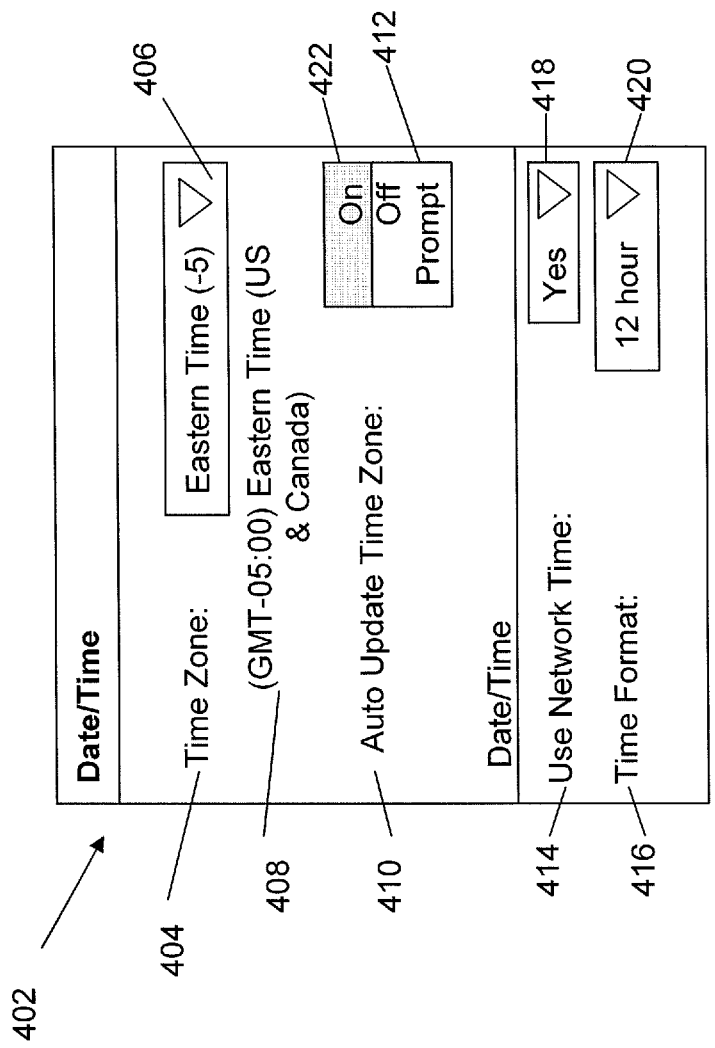
FIG. 22 is an example screen shot of a date or time, or both, application.

Turning to FIG. 22, an embodiment of a time/date graphical user interface (GUI) for interfacing with the time zone application 210 is provided. The screen shot 402 of the GUI for the time or date, or both, shows displays the time zone field 404 and the current time zone status 408. A time zone control 406 allows a user to adjust the time zone manually. The time zone control 406 may be a drop down selection list, as shown here, a typed entry field, or any other input interface for entering or selecting a time zone. Some non-limiting examples of various time zones include: mid-Atlantic (−2); W. Central Africa (+1); Brussels (+1); Dublin, London (GMT); Nairobi (+3); Kuwait (+3); Pacific Time (−8); and Tijuana (−8).

Continuing with FIG. 22, in addition to providing the option to manually set the time zone, the screen shot 402 shows that there is a setting for automatically updating the time zone 410. This automatic update setting 410 may be enabled or disabled by the user by using a setting control 412. The setting control 412 allows the user to turn on or off the automatic update time zone feature, as well as to prompt the user that a time zone change will be made. The prompt, not shown, would let the user know that a change in time zone has occurred and provide the user with the option to change the time zone accordingly or, for example, maintain the current time zone setting. As can be seen, the cursor or pointer 422, as indicated by the shaded region, shows that the user is selecting the "on" option, which enables the automatic updating of the time zone.

As discussed above, the time and time zone information may come from the cellular or network carrier 216 using a network time protocol. The screen shot 402 of the interface allows the user to select whether or not the mobile device 10 uses the network time 414, as shown by the corresponding network time controls 418, which provides a "yes" or "no" options. There is also a time format control 420 for setting the time format 416, for example, from either a twenty-four hour clock or a twelve hour clock.

Figure 6:
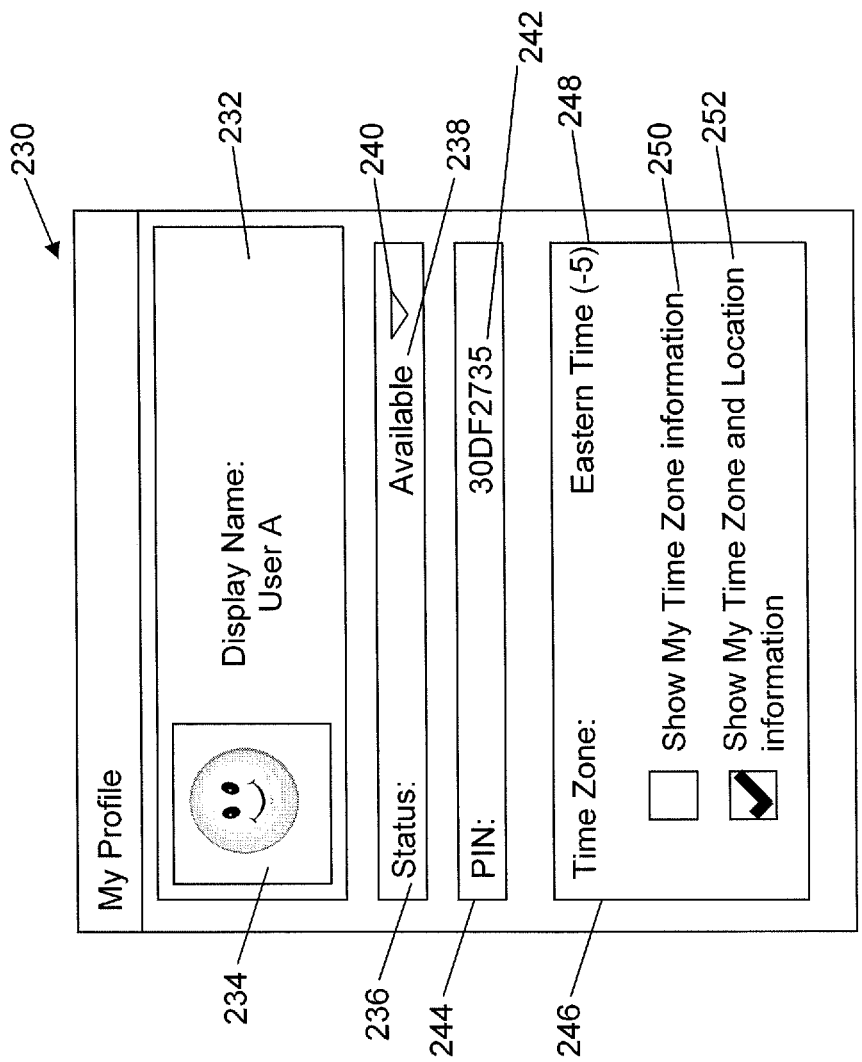
FIG. 6 is an example screen shot of an instant messaging profile for User A.

Turning to FIG. 6, User A may adjust the instant messaging settings on mobile device 10A to display certain presence information. In the "My Profile" screen shot 230, User A's display name 232 is provided, as well as an icon or picture 234 associated with User A. The presence status 236 may be changed from any one of the non-limiting examples: busy, available, do not disturb, away, or offline. The current status 238 shows that User A is available. In one embodiment of the GUI, the different presence status options may be selected from a drop down list as indicated by the downwards-facing arrow 240.

A PIN display 244 is also provided in the profile screen shot 230, which shows User A's PIN 242.

The profile 230 also includes a time zone display 246 which shows the current time zone 248. In the example screen shot 230, the time zone is Eastern Time (ET), which is five hours behind Greenwich Mean Time (GMT). It can be appreciated that the format of the time zone information may be displayed in any number of different ways, as desired by the user. Other time zone formats include GMT and Coordinated Universal Time (UTC). The profile 230 also provides an interface to allow a user to show or share the time zone information, or time zone and location information. The interface in FIG. 6 shows a selection box 250 for showing time zone information only, and another selection box 252 for showing time zone and location information. User A may select one of the boxes 250, 252 or none at all to indicate that time zone information should not be shared. Other GUIs that allow a user to select whether or not time zone information, or time zone and location information, should be shared with other mobile devices 10 are applicable to the principles herein.

Figure 7:
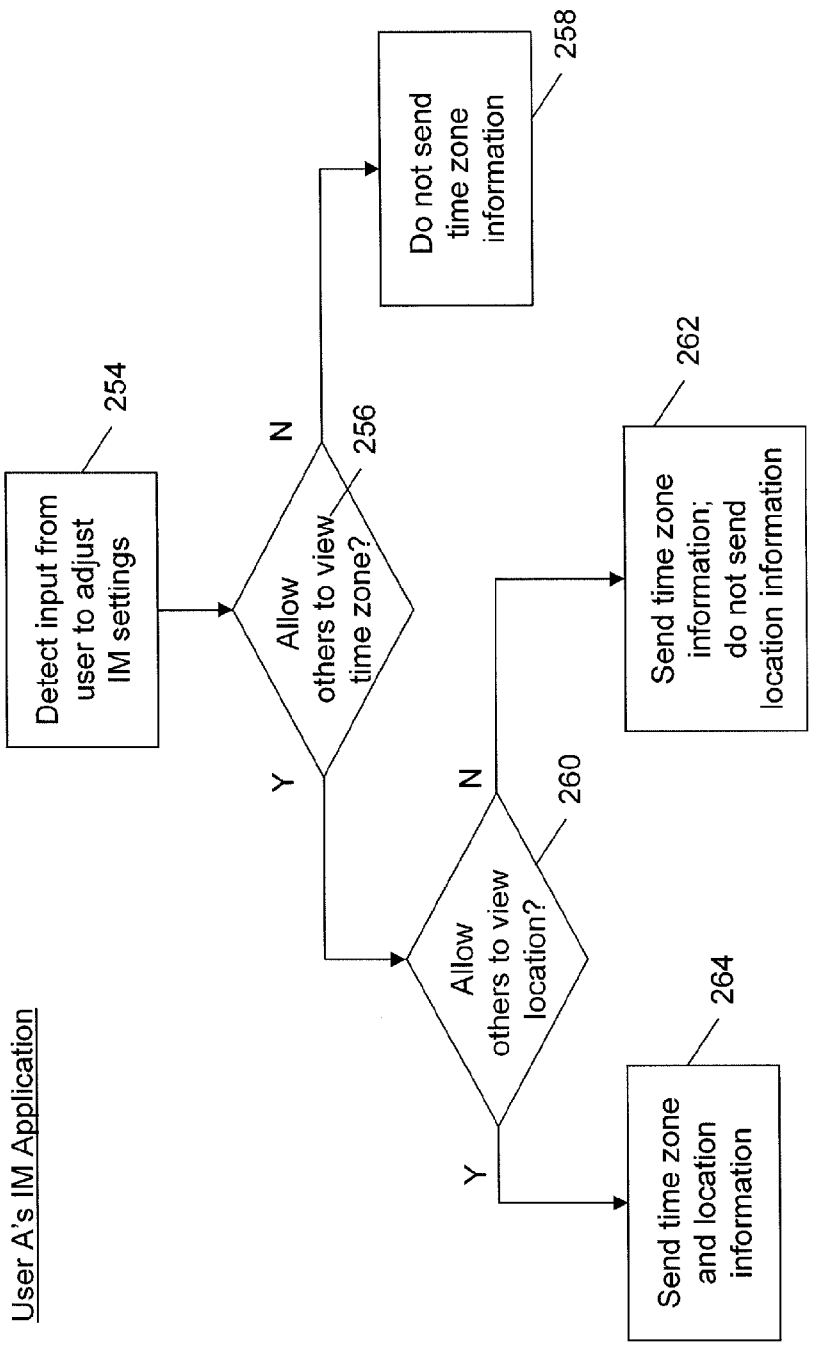
FIG. 7 is a flow chart illustrating example computer executable instructions for allowing whether time zone information, or time zone and location information is allowed to be shared with other mobile devices.

FIG. 7 shows a flow chart showing computer executable instructions of an IM application 50 when adjusting permissions with respect to whether or not to share time zone, or time zone and location information, based on user input. At block 254, the user adjusts the instant messaging setting, for example for the user's own profile. At block 256, the user selects whether or not other instant messaging contacts are allowed to view their time zone information. If user indicates "no", then, at block 258, the user's IM application 50 does not send the time zone information. If the user intends to allow others to view their time zone information, then at block 260, the user also indicates whether or not to allow others to view the location information as well. If the user indicates "no", then the IM application 50 sends only the time zone information to the IM server 86 or the other mobile devices 10 as per block 262. However, if the user indicates "yes", then at block 264 the IM application 50 sends the time zone information and the location information. It can be appreciated that, the principles described herein with respect to FIG. 7 may also be applied to send a mobile device's roaming status or roaming information to the IM server 86 or the other mobile devices 10. Further details in this regard are discussed further below.

FIGS. 8 and 9 show screen shots of a user's contact list 266 and a profile 278 of a contact on a user's contact list 277 having time zone presence information associated with one or more contacts. Turning first to FIG. 8, a user's contact list 266 shows a list of current conversations 268 with contacts or buddies, as well a general list of contacts or buddies 276. In either one or both of the current conversation list 268 and the general list 276, there is provided time zone information as presence information. For example, associated with a contact is a local time zone information in the form of current local time. Although not shown, once a contact's time zone information is known, the user's IM application 50 is able to calculate the current local time of the contact by taking into account the user's local time and the relative time difference between the user's time zone and the contact's time zone. As shown in FIG. 8, the current local time 272 of the contact's are provided, and in some cases the location information 274 as well. It can be appreciated the current local time 272 of a contact may be shown according to a twenty-four hour clock format, an A.M./P.M. format, or any other time format. The location information 274 may be displayed as a country's flag, a name of a place, or any other type of symbol.

Continuing with FIG. 8, it is shown in this example screen shot that User A is currently in conversations with the following contacts: User B, User C, User D and User F. User B's local time is 9:00 PM and is located in France. User C is in the same time zone as User A, and thus, the screen indicates that User C shares the same time zone as User A. User C does not show location information, as User C may have decided to only share time zone information and not location information. User D shows that the local time and location information is unavailable. Thus, it is possible that User D did not wish to share the time zone and location information. User F shows that the local time is 11:00 AM and that User F is located in Canada.

In FIG. 9, if a contact's profile 278 is displayed in detail, for example for User B's contact profile, then the display name 232 and picture 234 are provided. The status bar 236, current status 238, PIN display 246 and the contact's PIN 242 are also displayed. The location display 280 shows that User B is located in France 282. The time zone display 284 show the time zone information 282, which reads Central European Summer Time (CEST) 286, which is zero hours ahead or behind GMT. The current local time 288 is also displayed, in this case as 9:00 PM 290. As discussed above, and as can be readily understood, the current local time of a different time zone can be calculated based on the relative time zone differences as well as the current time in at least one of the time zones.

Figure 10:
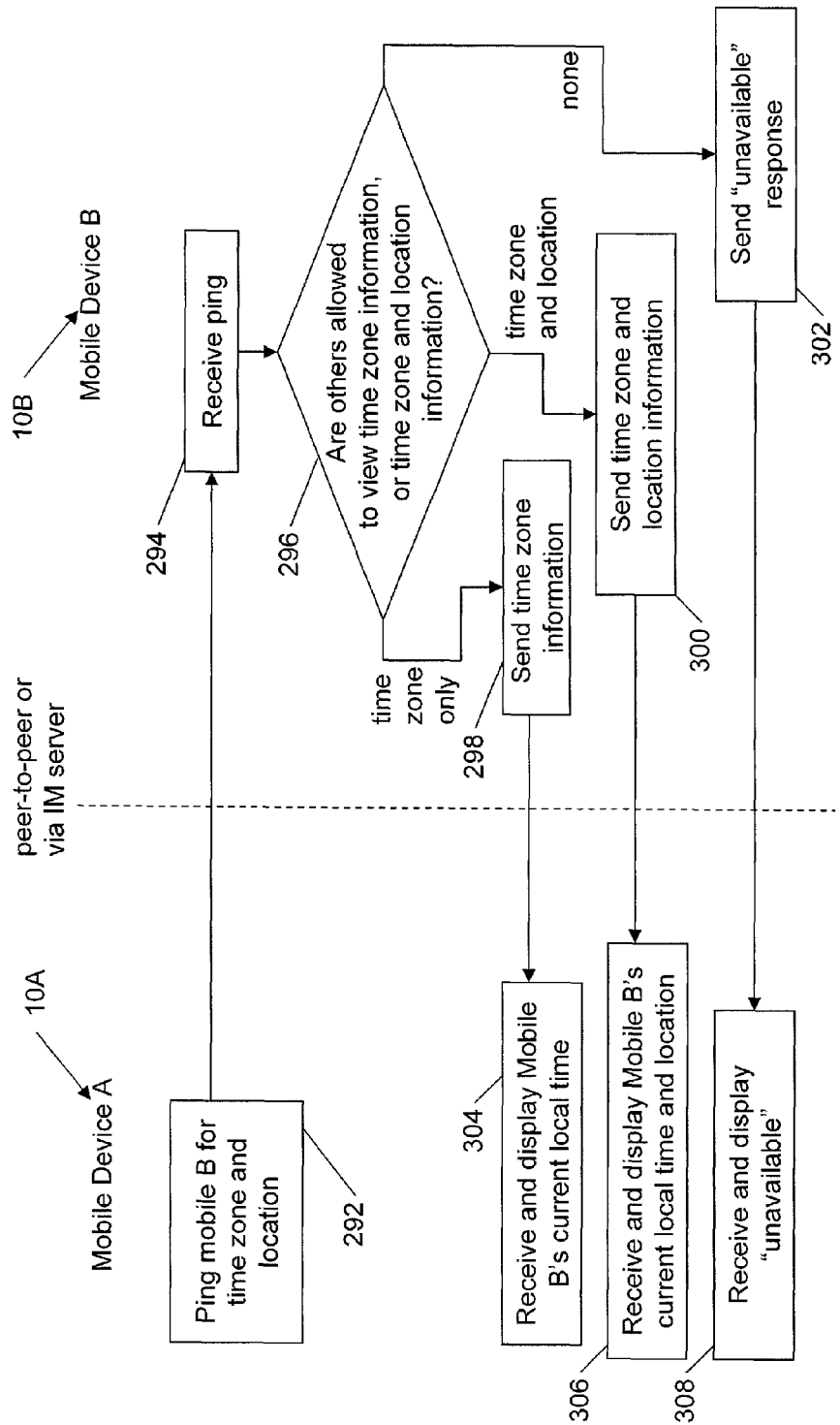
FIG. 10 is a flow chart illustrating example computer executable instructions between mobile device A and mobile device B for retrieving time zone information, or time zone and location information, from mobile device B.

As discussed above, the time zone information may be transmitted through a peer-to-peer configuration or via an IM server 86. In one embodiment, a mobile device 10 may request another mobile device 10 for time zone information. For example, in FIG. 10, mobile device 10A pings or requests mobile device 10B for time zone and location information, as per block 292. Mobile device 10B receives the ping or request at block 294. At block 296, the IM application 50 in mobile device 10B then determines whether others, or mobile device 10A in particular, is able to view time zone information, or time zone and location information, or neither. This information is determined by the settings or permissions of the instant messaging profile on mobile device 10B. If only time zone information is shared, then at block 298, mobile device 10B sends the time zone information to mobile device 10A, so that mobile device 10A may then display mobile device 10B's time zone information. If both time zone and location information are shared, then at block 300, mobile device 10B sends the time zone and location information to mobile device 10A, so that mobile device 10A can display the same at block 306. If neither information is available to be shared, then at block 302, mobile device 10B sends an "unavailable" response to mobile device 10A, so that, at block 308, mobile device 10A accordingly displays that User B's time zone presence information is unavailable.

Figure 12:
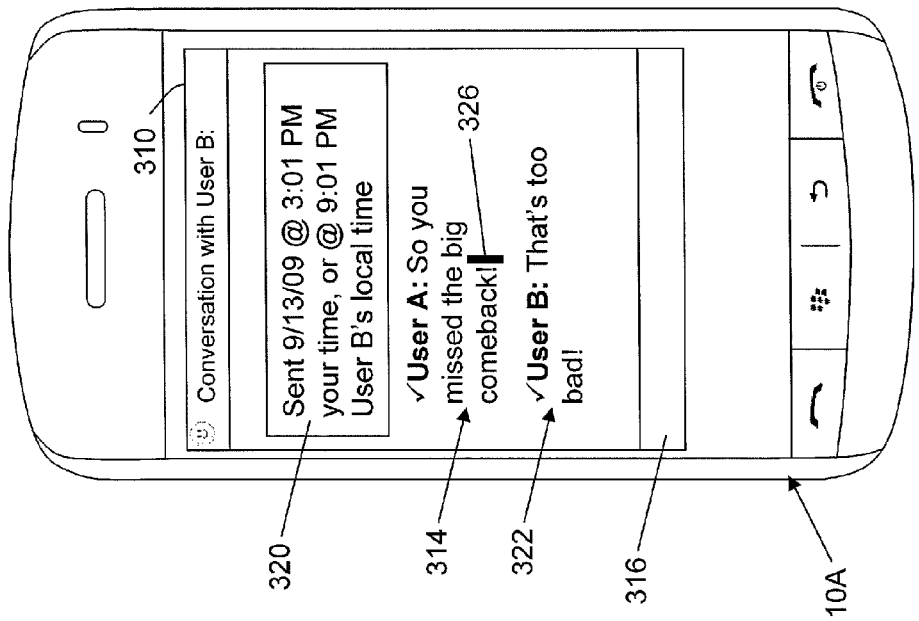
FIG. 12 is a pictorial diagram of a mobile device displaying a screen shot of an instant messaging conversation between User A and User B, as seen by User A, and displaying when User A's message was sent.
Figure 11:
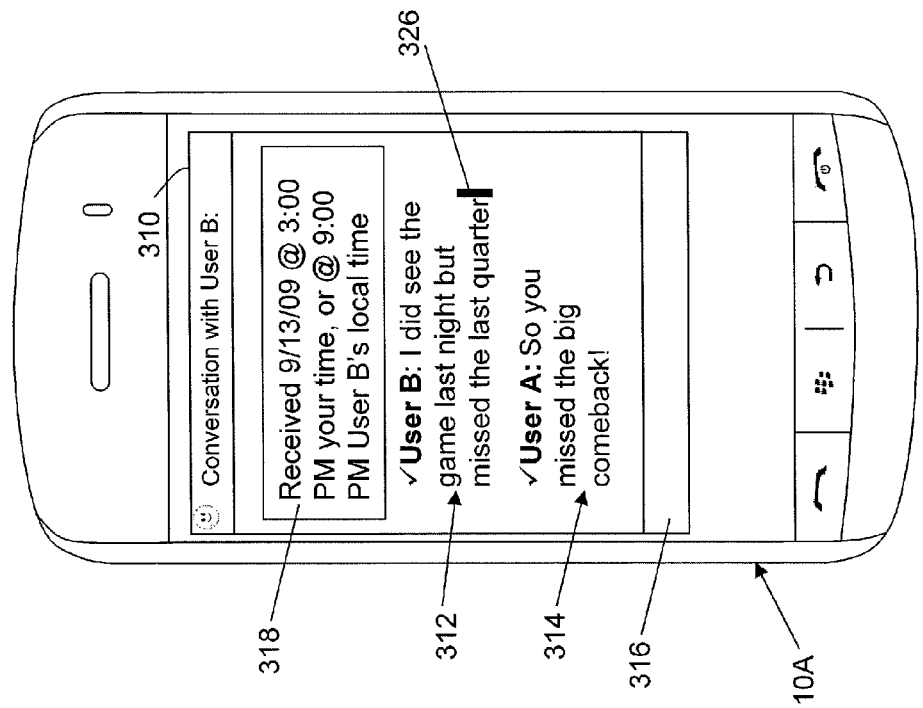
FIG. 11 is a pictorial diagram of a mobile device displaying a screen shot of an instant messaging conversation between User A and User B, as seen by User A, and displaying when User B's message was received.
Figure 13:
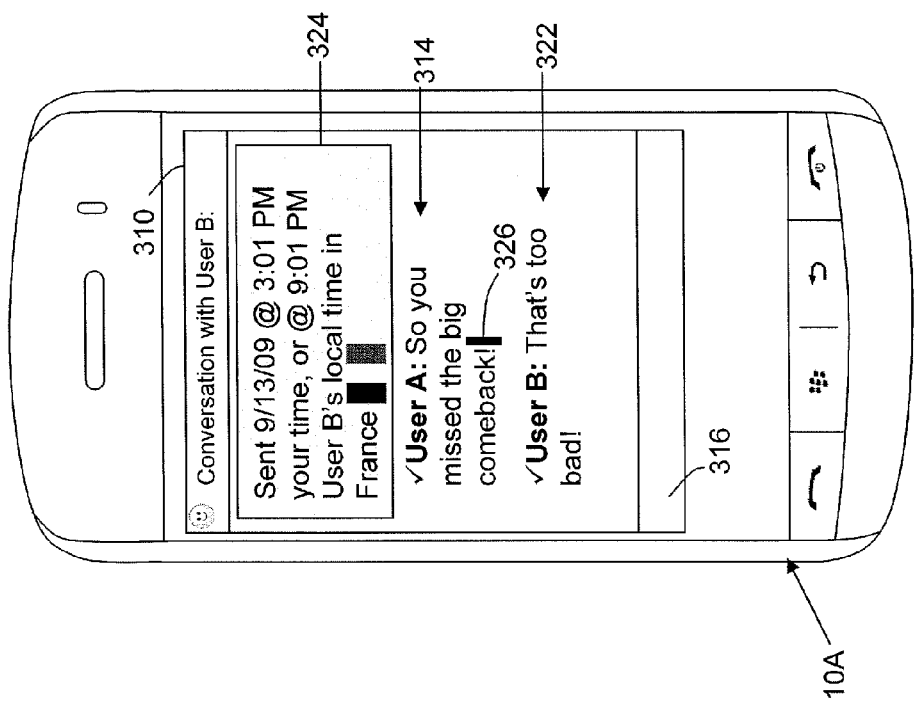
FIG. 13 is a pictorial diagram of a mobile device displaying a screen shot of an instant messaging conversation between User A and User B, as seen by User A, and displaying the local time and location of User B with respect to User A's sent message.

Turning to FIGS. 11, 12 and 13, a number of screen shots are provided showing a conversation between User A and User B on User A's mobile device 10A. Conversation window 310 shows that User A is engaged in a conversation with User B. A series of messages 312, 314, and 322 have been exchanged between User A and User B. A message box 316 allows User A to compose messages to be sent to User B. In some cases, User A may wish to display when a message was sent or received. In one embodiment, when a cursor or pointer 326 is moved beside a certain message, or to highlight a certain message, then the time and date the message was sent or received is displayed. In FIG. 11, the cursor or pointer 326 is moved beside message 312 from User B. This causes the pop-up display 318 to appear, which shows when the message was received according to User A's local time (e.g. 3:00 PM), as well as according to User B's local time (e.g. 9:00 PM). Similarly, in FIG. 12, when the cursor or pointer 326 is moved beside message 314 from User A, then the pop-up display 320 appears to indicate when the message was sent according to User A's local time, as well as User B's local time. In FIG. 13, a similar pop-up display 324 is shown, which also includes the location of User B.

Figure 14:
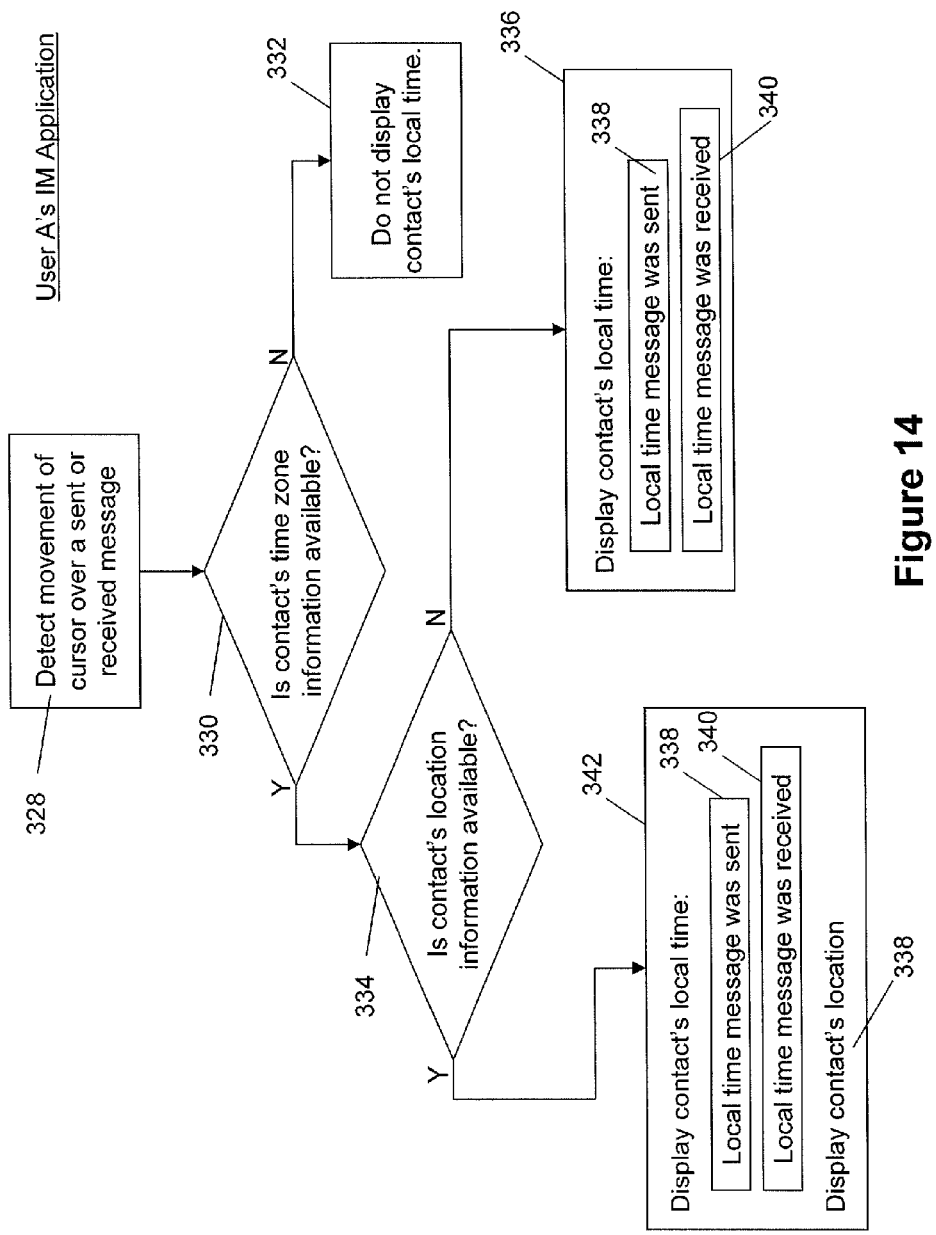
FIG. 14 is a flow chart illustrating example computer executable instructions for displaying a contact's local time or, local time and location, with respect to sent and received messages.

A process for utilizing the interface shown in FIGS. 11, 12 and 13 is provided in FIG. 14, whereby at block 328 the cursor or pointer 326 is moved over a sent or received message. At block 330, the user's IM application 50 determines whether it is aware of the contact's time zone information. If not, then at block 332, the IM application 50 does not display the contact's local time. If so, then at block 334, the IM application determines whether the contact's location information is available as well. If only the time zone information is available, then at block 336, the user's IM application 50 will display the contact's local time that a message was sent 338 by the user, or when a message was received 340 by the user, for example, through the form of a pop-up display. If both the time zone and location information are available, then as per block 342, the contact's location 344 and the contact's local time that the message was sent 338, or when it was received 340 will be displayed.

Figure 15:
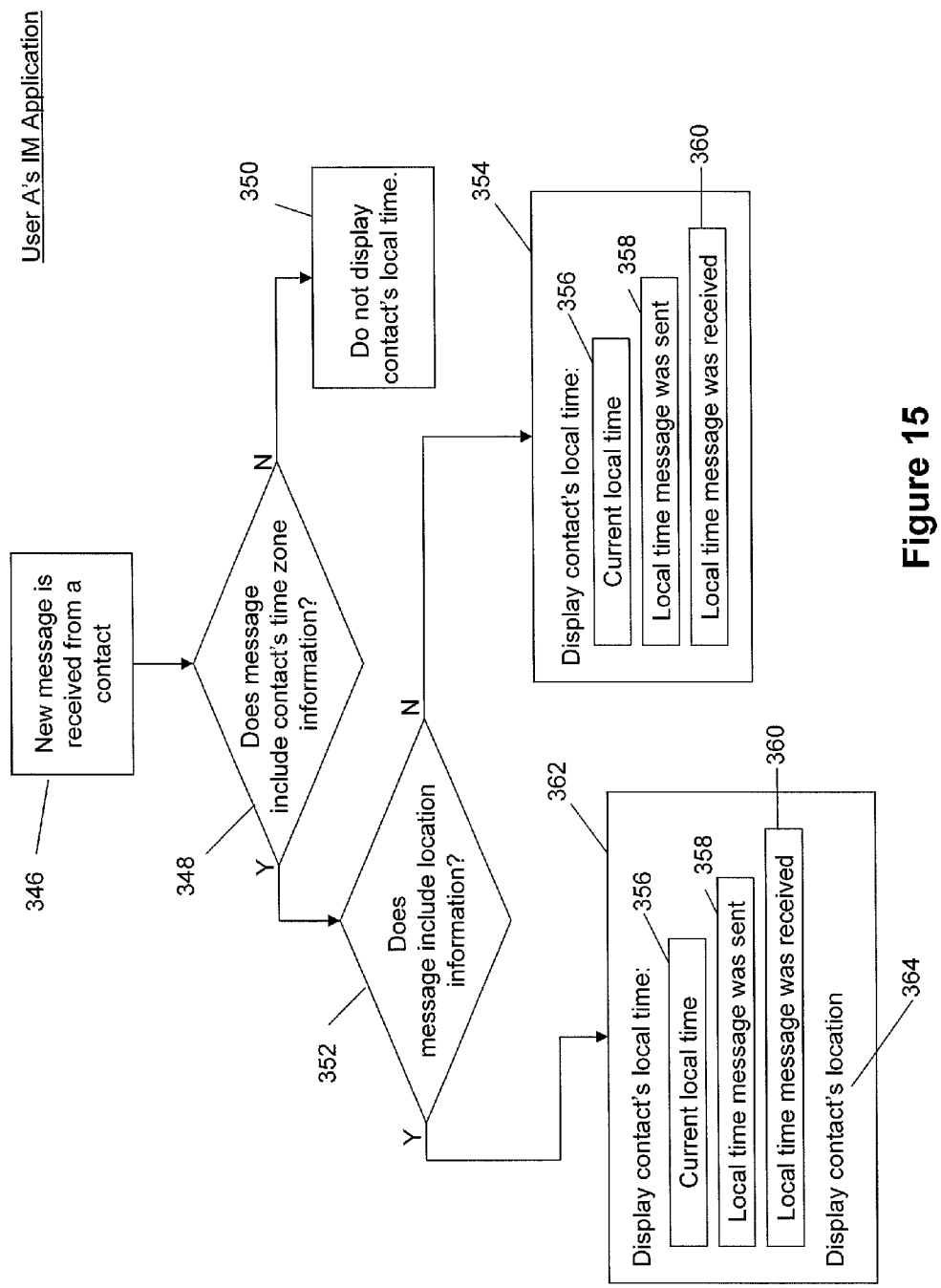
FIG. 15 is a flow chart illustrating example computer executable instructions for retrieving time zone information, or time zone and location information, from a received instant message.

FIG. 15 shows another embodiment of how time zone information, or time zone and location information can be transferred between users. At block 346, a mobile device 10 receives a new message from the user's contact. The IM application 50 determines if the new message includes the contact's time zone information, as per block 348. If not, then at block 350 the IM application 50 does not display the contact's local time. If so, the IM application 50 also determines if the new message also includes location information, as per block 352. If only time zone information is available, as per block 354, then the contact's time zone information is displayed, for example, in any of one of the following forms: current local time 356; local time message was sent 358; and local time message was received. If location information is available as well, then in addition to displaying the contact's time zone information, at block 362, the contact's location 364, is displayed.

Turning to FIGS. 16, 17 and 18, several screen shots are provided showing a conversation window 310 between User A and User B on User A's mobile device 10A. In the embodiment shown here, the conversation window 310 also displays the current local time of User B in the header portion 368. In FIG. 16, messages 366 and 312 have been exchanged between User A and User B. In the message box 316, User A is composing a new message 370, as indicated by the cursor or pointer 326. Once User A selects "send" 380 or attempts to the send the new message 370, then a prompt 372 is displayed, as per FIG. 17. The prompt 372 is related to the local time of User B and thus warns or otherwise notifies User A of the difference between its current time zone and that associated with User B. In this example, User B's current local time is 12:00 AM and may be sleeping. The prompt 372 confirms whether or not User A wishes to send the message now and provides option buttons 374, 376, and 378 to indicate the next step. In particular, there is a "yes" option 374, a "no" option 376, and a "yes: do not show this again" option 378. It can be appreciated that such intelligent or rule-based prompts may be perceived as undesirable to certain users, and thus can be disabled, as per option button 378.

In this example, User A selects the "yes" option 382 and, in FIG. 18, the new message 370 is sent as indicated by message 314.

Figure 19:
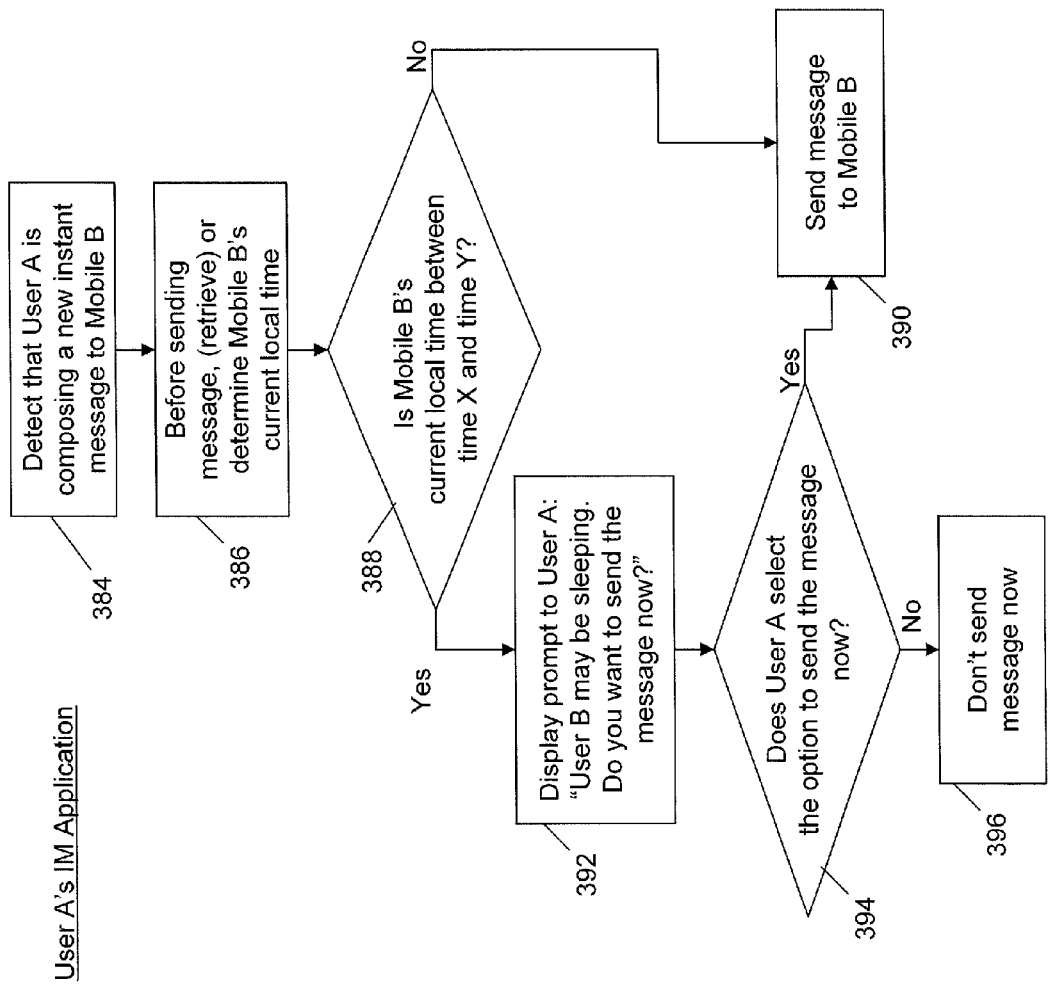
FIG. 19 is a flow chart illustrating example computer executable instructions for displaying a prompt to confirm whether a new message should be sent based on the contact's local time.

FIG. 19 shows the process of the interface illustrated in FIGS. 16, 17 and 18. At block 384 a new instant message is composed in the user's IM application 50 and is to be sent to mobile device 10B. At block 386, before the user's IM application 50 sends the message, the IM application 50 retrieves or determines the current local time of mobile device 10B. Then a time period rule is applied in block 388, determining whether or not the current local time of mobile device 10B is between time X and time Y (e.g. between 10:00 PM and 7:00 AM). If the answer is "no", then at block 390 the new message is sent to mobile device 10B. If "yes", then a prompt 372 is displayed to User A, indicating that User B may be sleeping and to confirm if the new message should be sent, as per block 392. Based on the decision on whether or not to send the new message now, as per block 394, if the answer is "yes", then the new message is sent as per block 390. If not, the new message is not sent now as per block 396.

It can be appreciated that any number of intelligent or rule-based decisions can be made based on the time zone information of a contact, as well the location. Other examples of intelligent or rule-based decisions relate to the time at which meetings or appointments are scheduled, and when a contact may be busy or available. For example, a time zone related rule specifies that work-related meetings may only be scheduled during work hours of the users or contacts participating in the meeting, taking into account that the users or contacts may be in different time zones. Thus, if a user attempts to schedule a meeting with a contact, whereby the meeting is outside the contact's business hours, then the IM application 50 may prompt the user with a message. Such a message could read: "contact may not be available for a conference call/meeting since it is outside their core business hours". The prompt may also suggest an alternate meeting time that suits the business hours of both the user and the contact, taking into account the different time zones.

Figure 20:
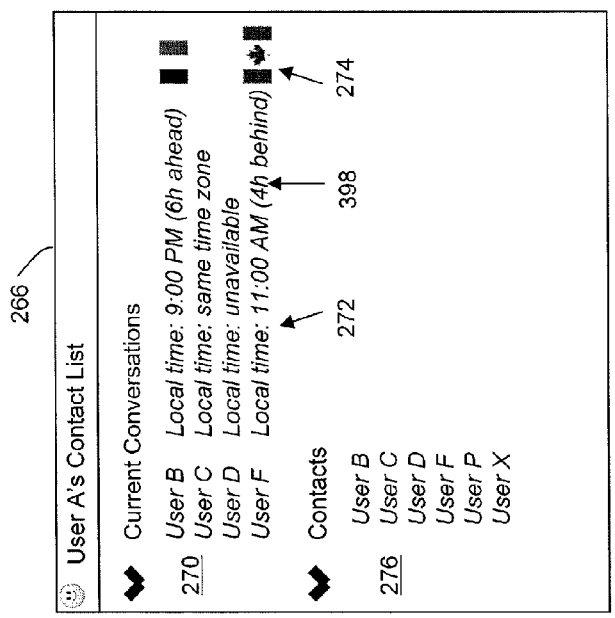
FIG. 20 is an example screen shot of an instant messaging contact list as seen by User A and showing relative time differences between each of the contacts and User A.

Turning to FIG. 20, another embodiment of a user's contact list 266 is provided, wherein the relative time difference 398 between a contact's time zone and the user's time zone is also displayed. The relative time difference 398 may be calculated or determined using a look-up chart of different time zones. It can be readily understood that displaying the time difference 398 may assist allow the user to more easily discern the current situation or presence of a contact.

Figure 21:
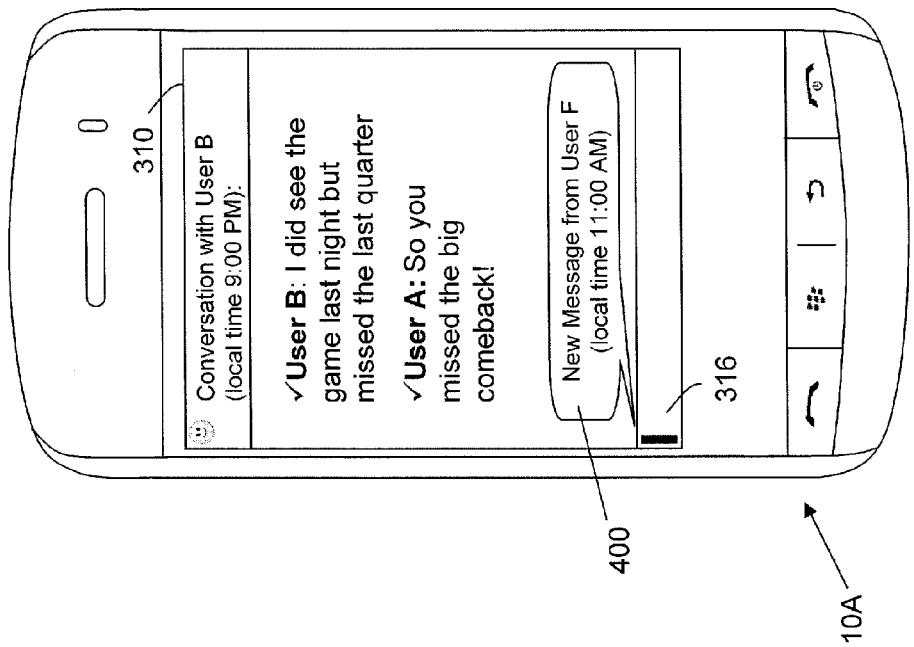
FIG. 21 is a pictorial diagram of a mobile device displaying an instant messaging conversation between User A and User B, as well as showing a new incoming message from User F with User F's local time.

Turning to FIG. 21, another embodiment of conversation window 310 between User A and User B is provided, wherein a new message alert 400 from an ancillary user shown. The new message alert 400 includes the current local time of the ancillary user. For example, while User A and User B are conversing, a new message alert 400 from User F appears, whereby the new message alert 400 show that User F's local time is 11:00 AM.

Figures 23, 24:
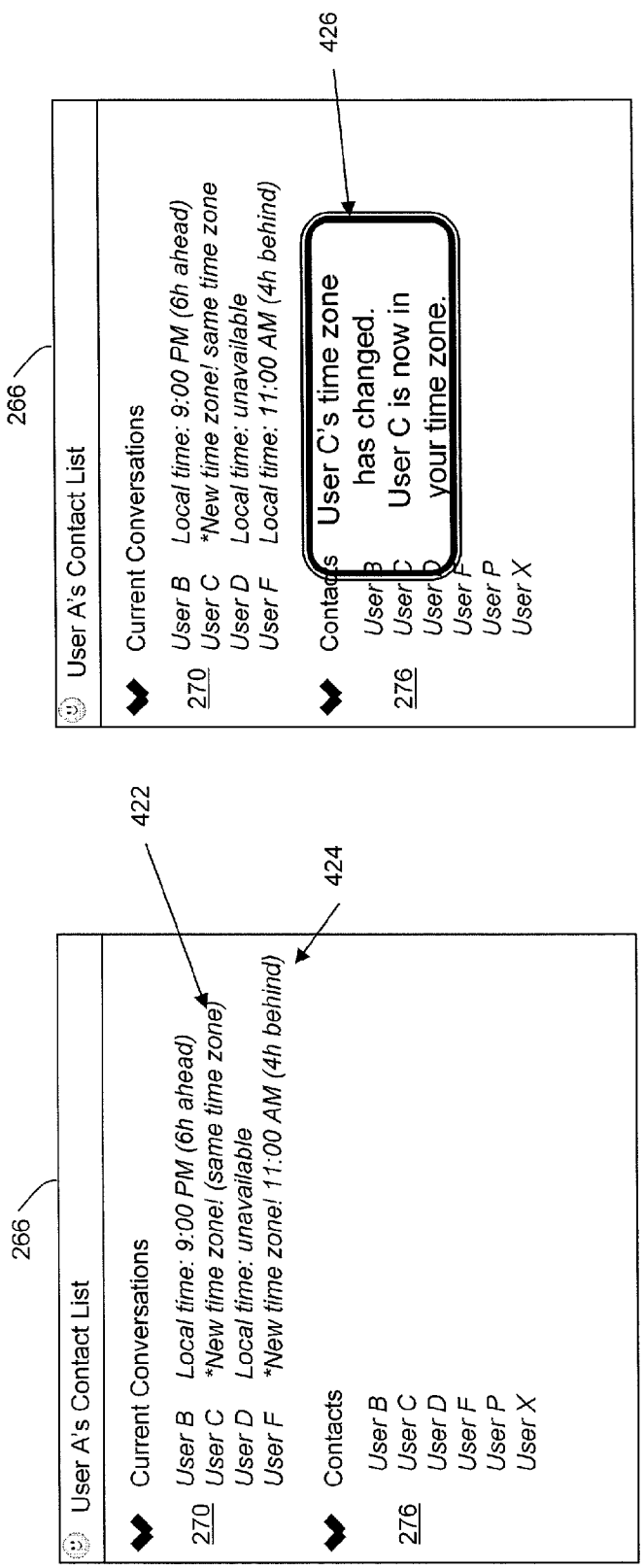
FIG. 23 is an example screen shot of an instant messaging contact list as seen by User A and showing notifications of changes in time zone of the contacts.
FIG. 24 is an example screen shot of an instant messaging contact list as seen by User A and showing a notification that a contact has changed time zones.

Turning to FIG. 23, another embodiment of a user's contact list 266 is provided. When a contact on the user's contact list 266 changes time zones, a notification is sent to the user's IM application 50 that the contact has changed time zones. For example, a contact (e.g. User C and User F) may have changed time zones, so that a notification 422, 424 is displayed on the contact list 266 beside the contact. A notification may include a symbol or text, or both, and may read, for example, "*New time zone!".

FIG. 24 shows another type of notification, which includes a message box 426 that indicates to the user that a certain contact's time zone has changed. If the certain contact's new time zone is the same as the user's time zone, then the message box 426 may also display that the contact's new time zone is the same as the user's time zone. It can be appreciated that any type of display or alert for notifying the user that a contact's time zone has been updated is applicable to the principles described herein.

Figure 25:
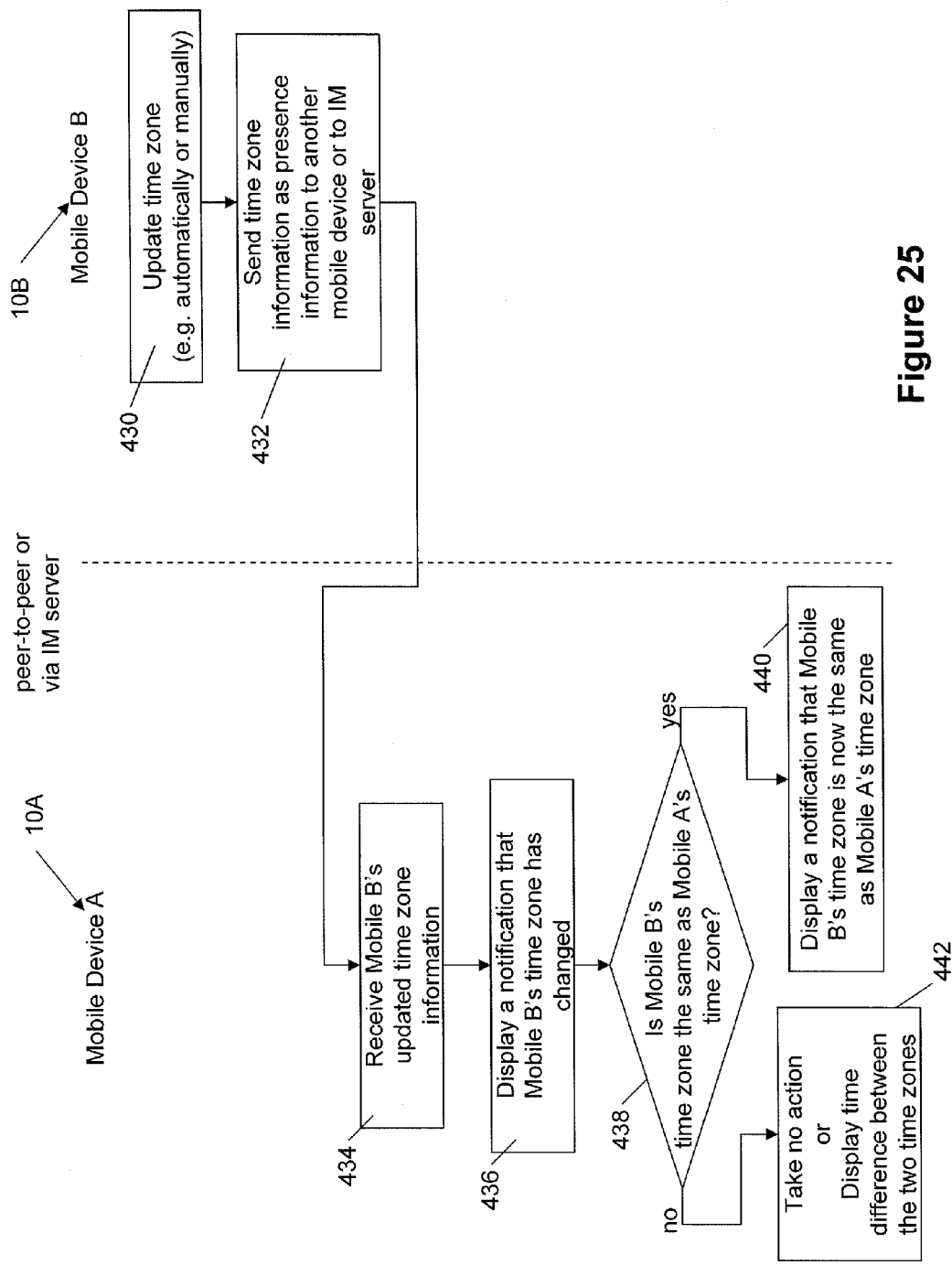
FIG. 25 is a flow chart illustrating example computer executable instructions for displaying a notification that a contact has changed time zones.

FIG. 25 shows an example method for providing notification that a time zone of a contact has been updated. User B may be a contact on User A's contact list. User B's mobile device, mobile device B 10B, updates the time zone information with a new time zone (block 430). The new time zone information can be updated automatically or manually. For example, when mobile device B 10B moves from one time zone to another time zone, mobile device B 10B may be able to detect the change in time zone through the communication subsystem 104 or the GPS receiver 121. Alternatively, User B may manually change the time zone setting on mobile device B 10B. Upon detecting and updating the new time zone, mobile device B sends the new time zone information to one or more other mobile devices or to the IM server 226 (block 432). User A's mobile device, mobile device A 10A, receives mobile device B's new time zone information (block 434). Upon detecting a change in mobile device B's time zone information, mobile device A 10A displays a notification that User B or mobile device B 10B has a new or different time zone (block 436). Mobile device A 10A then determines whether or not mobile device B's new time zone is the same as mobile device A's current time zone (block 438). If so, at block 440, mobile device A 10A displays a notification that mobile device B's new time zone is the same as mobile device A's time zone. If not, at block 442, no action is taken. Alternatively, at block 442, the time difference between the two time zones is displayed.

Although not shown, it can also be appreciated that a user's mobile device 10 can be notified when a contact's previous time zone was the same as the user's time zone, and then has been recently changed to a different time zone. Thus, the user is notified that the contact is no longer shares the same time zone as the user.

By providing a notification that a contact has updated or changed their time zone, the user can keep better track of the presence or change in presence of the contact. Such time zone presence, or change in time zone presence, allows a user to better determine when to contact a user.

Figure 26:
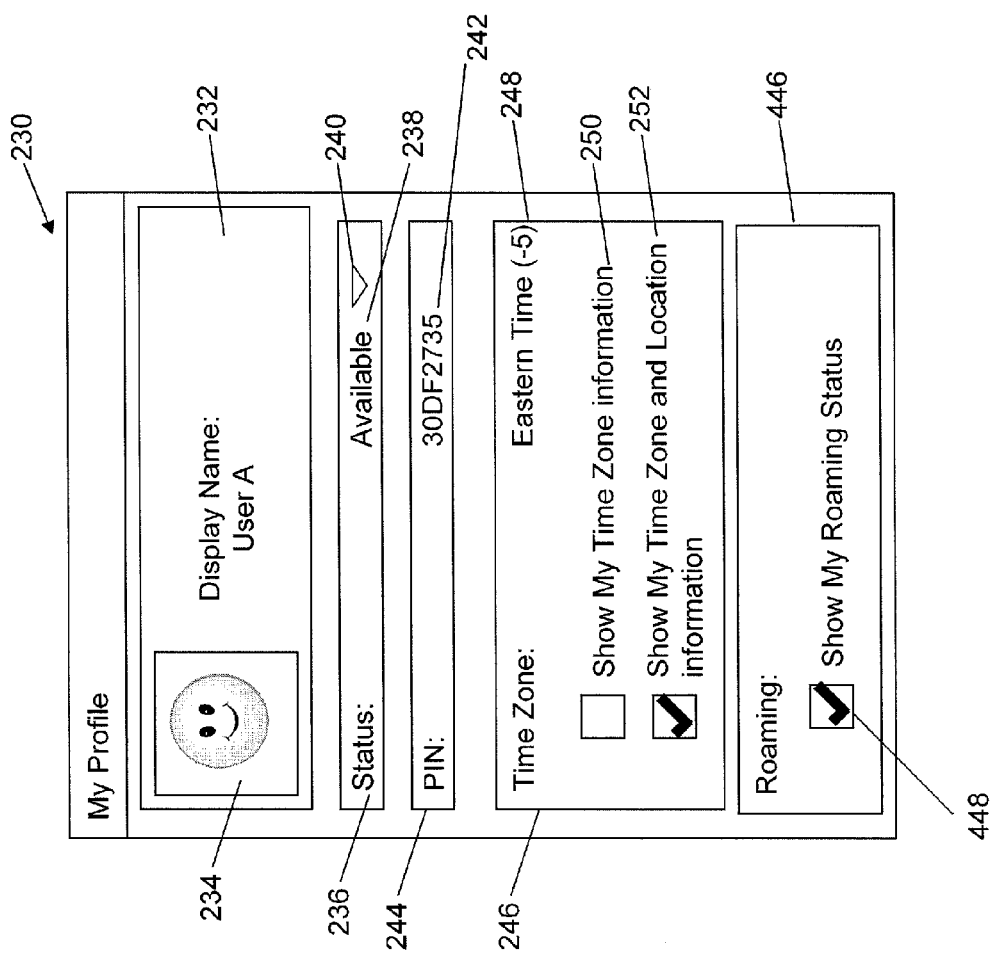
FIG. 26 is an example screen shot of an instant messaging profile for User A and showing an option to enable the display of User A's roaming status.

Turning to FIG. 26, another example embodiment of a "My Profile" screen shot 230 is provided, similar to the screen shot shown in FIG. 6. In FIG. 26, a roaming display 446 is shown on the screen shot 230. An option box 448 allows a user to control whether or not to provide the user's roaming status or roaming information as part of the IM presence information to the user's contacts. As discussed above, the roaming status or roaming information may be sent to the IM server 86 or one or more other mobile devices 10 according to the principles described with respect to FIG. 7.

The term "roaming" as used herein may refer to the ability for a user to use their mobile device 10 outside their regular phone or data service area. For example, when a user travels with their mobile device 10 outside of the "home" service area defined by a phone or data service provider, then the mobile device 10 is considered to be roaming. In some cases, higher cost rates may be charged for calls or data transmitted or received while roaming. It can be appreciated that the methods and systems for detecting when a mobile device 10 is roaming is known to a person skilled in the art. Such methods and systems for detecting roaming may include receiving a data message from the network carrier 216 that the mobile device 10 is outside its regular phone or data service area.

Figure 27:
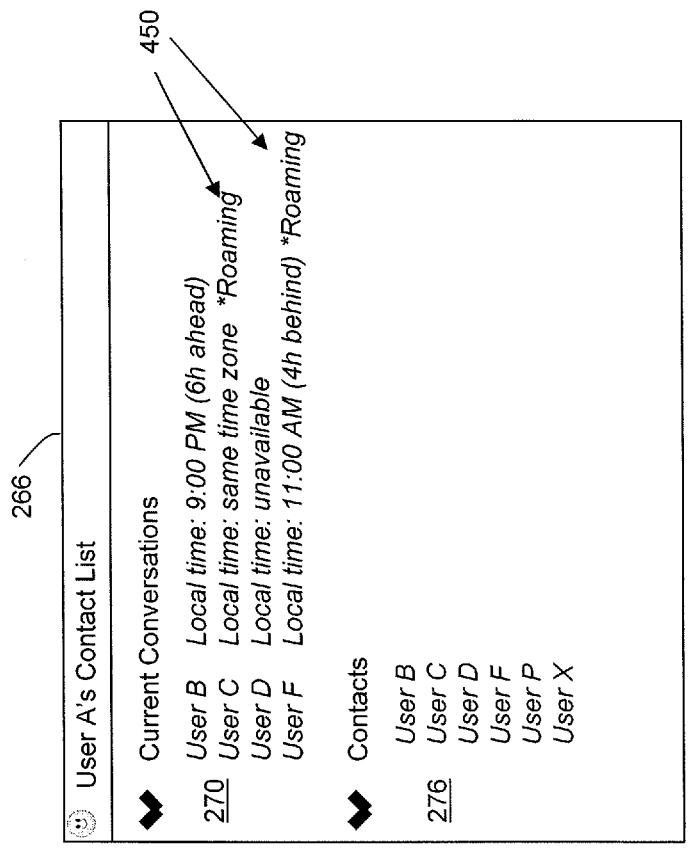
FIG. 27 is an example screen shot of an instant messaging contact list as seen by User A and showing a notification a contact's time zone status and roaming status.

Turning to FIG. 27, a contact list 266 provides a roaming status indicator 450 associated with one or more of the contacts on the contact list 266. The roaming status indicator 450 shows the user that a contact's mobile device 10 is currently roaming. Thus, the user can detect whether or not the contact is within or away from their regular service provider area. The combination of showing both the time zone information and roaming status indicator 450 allows the user to determine whether a contact is likely to be in a time zone that is different from their regular time zone. For example, when a contact is in their regular time zone, they are likely to be in the area of their regular service provider. However, if the contact travels to a different location outside the coverage area of their regular service provider, then the roaming status indicator 450 is displayed alongside the contact's time zone information. The user can then determine that there is a possibility that the contact's time zone is not their regular time zone, since they are currently roaming.

In another embodiment (not shown) a user can also choose whether or not to display their regular time zone information as IM presence information through the IM application 50. The term "regular time zone" as used herein may refer to the time zone in which a user spends the majority of their time. A GUI, similar to the "My Profile" screen 230 in FIG. 26, may include an option to enable the display of their regular time zone information. On the contact list 266, an IM application 50 may compare a contact's regular time zone information and the contact's current time zone information. If the contact's regular time zone information and their current time zone information do not match, then an indicator is shown to indicate the difference between the contact's current time zone and the contact's regular time zone. Such an indicator of the contact's presence allows the user to determine that the contact is in a time zone that is different from their regular time zone.

Figure 28:
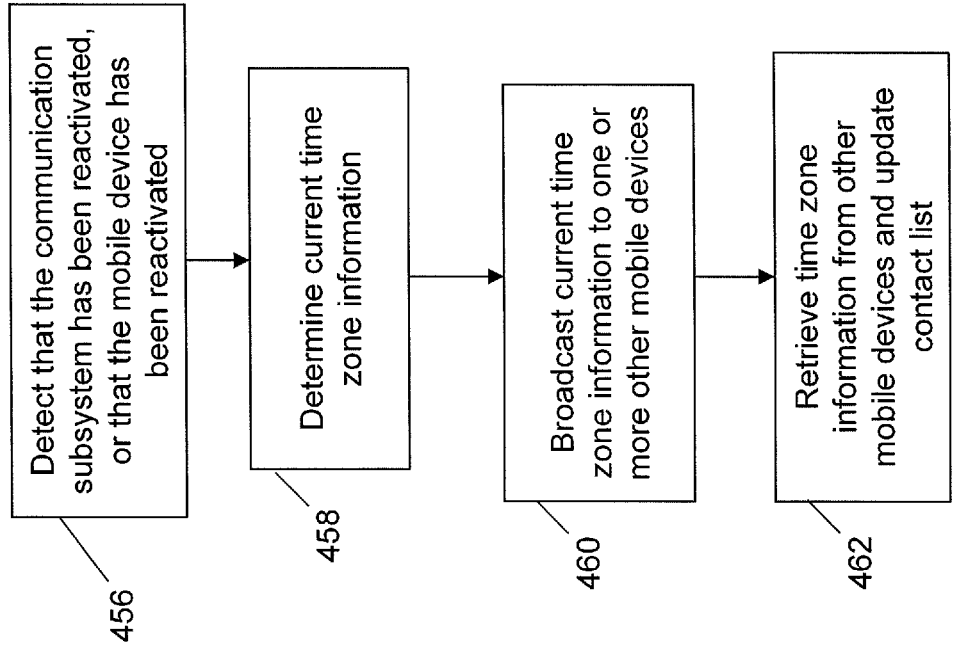
FIG. 28 is a flow chart illustrating example computer executable instructions for broadcasting and retrieving time zones as instant messaging presence.

Turning to FIG. 28, a set of example computer executable instructions is provided for determining when time zone information is broadcasted or retrieved, or both. In some circumstances, the mobile device 10 or the communication subsystem 104 may be turned off. For example, a user may deactivate the communication subsystem 104 or turn off the mobile device 10 when travelling on an airplane, or to conserve power. It can be appreciated that when either the communication subsystem 104 or the mobile device 10 are deactivated, a user cannot broadcast their time zone information as IM presence or receive time zone information from their contacts. During this period of deactivation, a user's time zone may have changed, or one or more of the contacts' time zones may have changed. Therefore, at block 456, the IM application 50 detects that the communication subsystem 104 has been reactivated or that the mobile device 10 has been reactivated. At block 458, the mobile application 50 determines the current time zone information and, at block 460, broadcasts the current time zone information to one or more of the contacts (e.g. the contacts' mobile devices 10). At block 462, the mobile application 50 retrieves time zone information from the contacts and updates the contact list. In this way, when the communication subsystem 104 or the mobile device 10 are reactivated, the time zone information is updated on the IM application and exchanged between the user and the contacts.

Figure 29:
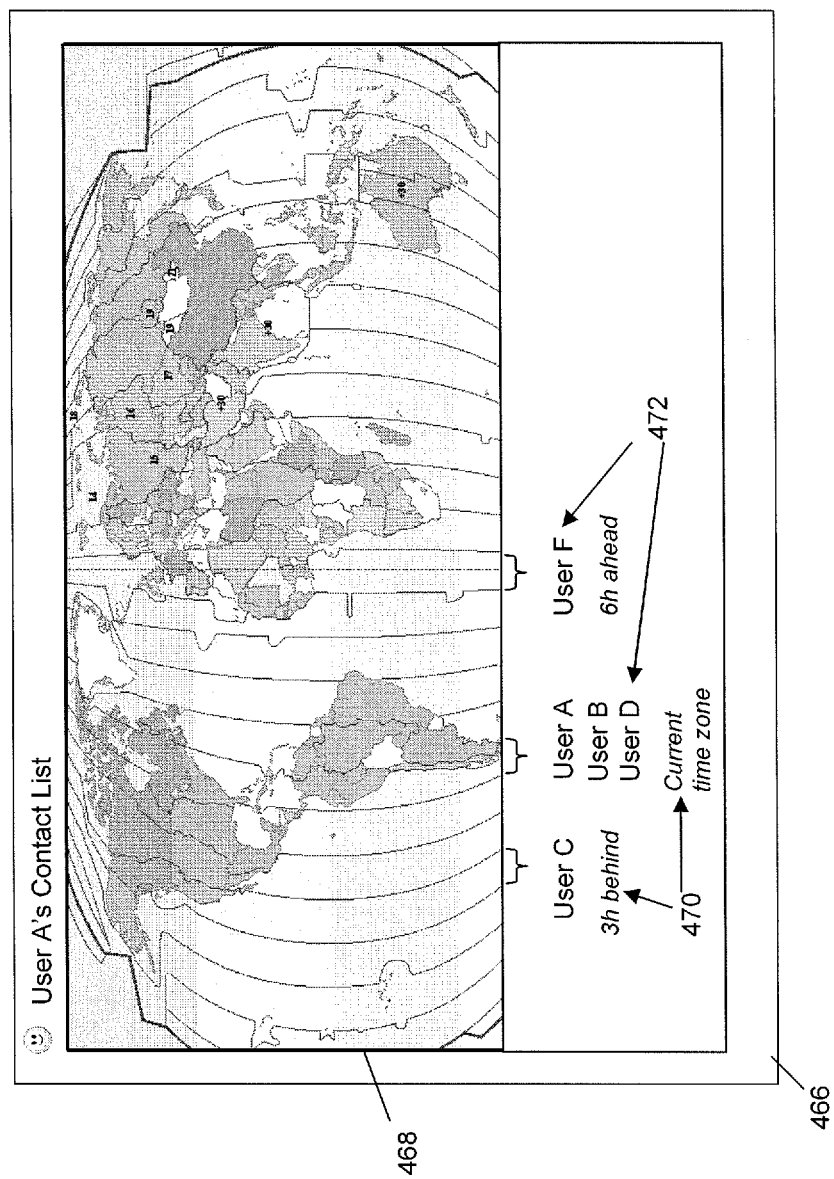
FIG. 29 is an example screen shot of an instant messaging contact list as seen by User A and showing a map of the different time zones.

FIG. 29 shows another example embodiment of a location-based contact list 466, with similar functionality to the contact lists 266 described above. However, in FIG. 29, a map 468 of the world is provided to illustrate the different time zones. Contacts 472 are organized or grouped on the contact list 466 according to their time zones. For example, contacts belonging to a first time zone form a first group, while contacts belonging to a second time zone form a second group. In this way the user can more easily determine the time zone information of the contacts, as well as to determine which contacts share common time zones. In the embodiment shown in FIG. 29, the groups of contacts are positioned to correspond with the location of the time zones on the map 468. For example, User A's current time zone shares the same time zone with User B and User D, and the position of their contacts 472 on the contact list 466 corresponds with the time zone for New York city, U.S.A. as shown on the map 468. User C is in a different time and the position of their contact 472 on the contact list 466 corresponds with the time zone for Vancouver, Canada as shown on the map 468. There may be a time indicator 470 associated with each grouping of one or more contacts 472. The time indicator 470 may show the current time or the number of hours ahead or behind the user's time. The time indicator 470 in FIG. 29 shows the time difference between a contact and the user. For example, the time in Vancouver is 3 hours behind the time in New York city. Through the contact list 466, a user can provide a selection input associated with a contact to, for example, invoke a conversation window 310 with the selected contact.

It can be appreciated that other displays of a contact list 466 showing contacts grouped by time zone are applicable to the principles described herein. It can be further appreciated that, where location information of a contact is provided, the contacts can be positioned on a map 468 according to their location.

The steps or operations in the flow charts described herein are just for example. There may be many variations to these steps or operations without departing from the spirit of the invention. For instance, the steps may be performed in a differing order, or steps may be added, deleted, or modified.

It can also be appreciated that the displays or screens described herein are just for example. There may be many variations to the configuration and arrangement of information and user interface controls without departing from the scope of the above principles. For instance, the information and the user interface controls may be in a differing order, or may be added, deleted, or modified.

Although the above has been described with reference to certain specific embodiments, various modifications thereof will be apparent to those skilled in the art without departing from the scope of the claims appended hereto.

The invention claimed is:

1. A method of displaying time zone information for at least one contact listed in an instant messaging application on a mobile device, said method comprising said mobile device:
   receiving said time zone information for said at least one contact;
   determining that said time zone information for said at least one contact has changed; and
   displaying new time zone information for said at least one contact in one or more interfaces associated with said instant messaging application.

2. The method according to claim 1, further comprising displaying a first notification of said new time zone information.

3. The method according to claim 1, wherein said one or more interfaces comprises any one or more of a contact list comprising said at least one contact, and a respective conversation with said at least one contact.

4. The method according to claim 3, further comprising displaying an indicator that said at least one contact and said mobile device share said time zone information if it is determined that said time zone information corresponding to said at least one contact is the same as time zone information for the mobile device.

5. The method according to claim 3, wherein said time zone information is displayed in said conversation, the method further comprising displaying a local time of when a message was sent or received in said conversation according to said time zone information of said at least one contact.

6. The method according to claim 3, wherein said time zone information is displayed in said conversation, the method further comprising:
   detecting composition of a new message to said at least one contact; and
   displaying a prompt to confirm whether or not to send said new message prior to sending said new message to said at least one contact after determining that a current local time of said at least one contact is within a specified time period.

7. The method according to claim 3, wherein said time zone information is displayed in said contact list, said contact list comprising a plurality of contacts, said mobile device receiving and displaying time zone information corresponding to each one of said plurality of contacts.

8. The method according to claim 7, wherein a first one or more of said plurality of contacts associated with a first time zone form a first group in said contact list, and, optionally, a second one or more of said plurality of contacts associated with a second time zone form a second group in said contact list.

9. The method according to claim 3, wherein said time zone information is displayed in said contact list, said contact list comprising a map showing locations of different time zones, said at least one contact being positioned to correspond to a location of said time zone information on said map.

10. The method according to claim 3, further comprising:
    displaying a second notification that said time zone information for said at least one contact is now the same as said time zone information of said mobile device if it is determined that said new time zone information is the same as time zone information of said mobile device; and
    displaying a time difference between said new time zone information and said time zone information of said mobile device if it is determined that said new time zone information is not the same as time zone information of said mobile device.

11. The method according to claim 3, further comprising displaying an indicator that said at least one contact no longer shares the same time zone as said mobile device if said time zone information was the same as time zone information of said mobile device and if said new time zone information is different from said time zone information of said mobile device.

12. The method according to claim 1, further comprising displaying a roaming indicator with said new time zone information if said at least one contact is located outside a coverage area for a regular phone or data service provider of said at least one contact.

13. The method according to claim 1, further comprising:
    comparing regular time zone information of said at least one contact and said new time zone information; and
    displaying an indication that said regular time zone information for said at least one contact and said new time zone information are different if said regular time zone information and said new time zone information do not match.

14. A mobile device comprising:
    a processor; and
    at least one memory, the at least one memory storing instructions executable by the processor to:
    receive said time zone information for said at least one contact;
    determine that said time zone information for said at least one contact has changed; and
    display new time zone information for said at least one contact in one or more interfaces associated with said instant messaging application.

15. The mobile device according to claim 14, further comprising instructions executable by the processor to display a first notification of said new time zone information.

16. The mobile device according to claim 14, wherein said one or more interfaces comprises any one or more of a contact list comprising said at least one contact, and a respective conversation with said at least one contact.

17. The mobile device according to claim 16, further comprising instructions executable by the processor to display an indicator that said at least one contact and said mobile device share said time zone information if it is determined that said time zone information corresponding to said at least one contact is the same as time zone information for the mobile device.

18. The mobile device according to claim 16, wherein said time zone information is displayed in said conversation, the computer executable instructions further comprising instructions executable by the processor to display a local time of when a message was sent or received in said conversation according to said time zone information of said at least one contact.

19. The mobile device according to claim 16, wherein said time zone information is displayed in said conversation, the computer executable instructions further comprising instructions executable by the processor to:
   detect composition of a new message to said at least one contact; and
   display a prompt to confirm whether or not to send said new message prior to sending said new message to said at least one contact after determining that a current local time of said at least one contact is within a specified time period.

20. The mobile device according to claim 16, wherein said time zone information is displayed in said contact list, said contact list comprising a plurality of contacts, said mobile device receiving and displaying time zone information corresponding to each one of said plurality of contacts.

21. The mobile device according to claim 20, wherein a first one or more of said plurality of contacts associated with a first time zone form a first group in said contact list, and, optionally, a second one or more of said plurality of contacts associated with a second time zone form a second group in said contact list.

22. The mobile device according to claim 16, wherein said time zone information is displayed in said contact list, said contact list comprising a map showing locations of different time zones, said at least one contact being positioned to correspond to a location of said time zone information on said map.

23. The mobile device according to claim 16, further comprising instructions executable by the processor to:
   display a second notification that said time zone information for said at least one contact is now the same as said time zone information of said mobile device if it is determined that said new time zone information is the same as time zone information of said mobile device; and
   display a time difference between said new time zone information and said time zone information of said mobile device if it is determined that said new time zone information is not the same as time zone information of said mobile device.

24. The mobile device according to claim 16, further comprising instructions executable by the processor to display an indicator that said at least one contact no longer shares the same time zone as said mobile device if said time zone information was the same as time zone information of said mobile device and if said new time zone information is different from said time zone information of said mobile device.

25. The mobile device according to claim 14, further comprising instructions executable by the processor to display a roaming indicator with said new time zone information if said at least one contact is located outside a coverage area for a regular phone or data service provider of said at least one contact.

26. The mobile device according to claim 14, further comprising instructions executable by the processor to:
   compare regular time zone information of said at least one contact and said new time zone information; and
   display an indication that said regular time zone information for said at least one contact and said new time zone information are different if said regular time zone information and said new time zone information do not match.

27. A non-transitory computer readable medium comprising computer executable instructions for displaying time zone information for at least one contact listed in an instant messaging application on a mobile device, said computer executable instructions comprising instructions for:
   receiving said time zone information for said at least one contact;
   determining that said time zone information for said at least one contact has changed; and
   displaying new time zone information for said at least one contact in one or more interfaces associated with said instant messaging application.

* * * * *